(12) United States Patent
Hendry

(10) Patent No.: US 7,926,874 B2
(45) Date of Patent: Apr. 19, 2011

(54) BELT-ANCHOR SYSTEM FOR JUVENILE VEHICLE SEAT

(75) Inventor: Donald H. Hendry, Rockland, MA (US)

(73) Assignee: Cosco Management, Inc., Wilmington, DE (US)

( * ) Notice: Subject to any disclaimer, the term of this patent is extended or adjusted under 35 U.S.C. 154(b) by 287 days.

(21) Appl. No.: 12/205,304

(22) Filed: Sep. 5, 2008

(65) Prior Publication Data

US 2009/0066131 A1    Mar. 12, 2009

Related U.S. Application Data

(60) Provisional application No. 60/970,289, filed on Sep. 6, 2007.

(51) Int. Cl.
*B60N 2/28* (2006.01)

(52) U.S. Cl. ............................. 297/256.16; 297/250.1

(58) Field of Classification Search ............... 297/250.1, 297/256.16, 468, 481
See application file for complete search history.

(56) References Cited

U.S. PATENT DOCUMENTS

| | | |
|---|---|---|
| 958,249 A | 5/1910 | Hirsh |
| 1,825,016 A | 9/1931 | Salisbury |
| 2,326,328 A | 8/1943 | Bush |
| 3,136,579 A | 6/1964 | Hunter |
| 3,510,151 A | 5/1970 | Weman |
| 4,387,489 A | 6/1983 | Dudek |
| 4,591,208 A * | 5/1986 | McDonald et al. ........... 297/487 |
| 4,660,889 A | 4/1987 | Anthony et al. |
| 4,796,919 A | 1/1989 | Linden |
| 4,854,639 A | 8/1989 | Burleigh et al. |
| 5,000,481 A | 3/1991 | Willson |
| 5,186,520 A | 2/1993 | Whitaker et al. |
| 5,579,561 A | 12/1996 | Smith et al. |
| 5,611,596 A | 3/1997 | Barley et al. |
| 5,653,003 A | 8/1997 | Freeman |
| 5,671,971 A | 9/1997 | Koyanagi et al. |
| 5,845,372 A | 12/1998 | Smith et al. |
| 6,152,528 A | 11/2000 | Van Montfort |
| 6,390,562 B1 | 5/2002 | Takamizu et al. |
| 6,471,298 B2 | 10/2002 | Carine et al. |
| 6,508,510 B2 | 1/2003 | Yamazaki |
| 6,672,664 B2 | 1/2004 | Yanaka et al. |
| 6,695,400 B2 | 2/2004 | Washizuka et al. |
| 6,863,345 B2 * | 3/2005 | Kain ..................... 297/256.16 |
| 7,059,676 B2 | 6/2006 | McNeff |
| 7,163,265 B2 | 1/2007 | Adachi |
| 7,300,113 B2 * | 11/2007 | Baloga et al. ............... 297/468 |
| 7,325,871 B2 | 2/2008 | Gangadharan et al. |
| 7,488,034 B2 * | 2/2009 | Ohren et al. ............ 297/216.11 |
| 2003/0151286 A1 | 8/2003 | Kain |
| 2005/0110318 A1 | 5/2005 | Meeker et al. |
| 2005/0184567 A1 | 8/2005 | Carpenter et al. |
| 2005/0253431 A1 | 11/2005 | Hei et al. |

(Continued)

*Primary Examiner* — David Dunn
*Assistant Examiner* — Tania Abraham
(74) *Attorney, Agent, or Firm* — Barnes & Thornburg LLP

(57) ABSTRACT

A seat base for a child restraint adapted to receive a juvenile seat. The seat base includes a first anchor belt and a second anchor belt for anchoring the seat base to a vehicle seat of a vehicle. The seat base includes a belt anchor system for anchoring the first and second anchor belts to the seat base when the first and second anchor belts are in a use position and for anchoring a vehicle belt of the vehicle to the seat base when the first and second anchor belts are in a stored position.

30 Claims, 12 Drawing Sheets

U.S. PATENT DOCUMENTS

| | | |
|---|---|---|
| 2005/0264062 A1 | 12/2005 | Longenecker et al. |
| 2006/0091709 A1 | 5/2006 | Emmert |
| 2006/0261650 A1 | 11/2006 | Billman et al. |
| 2006/0261651 A1 | 11/2006 | Nolan et al. |
| 2007/0069060 A1 | 3/2007 | Maciejczyk |
| 2007/0228788 A1* | 10/2007 | Meeker et al. ............ 297/250.1 |

* cited by examiner

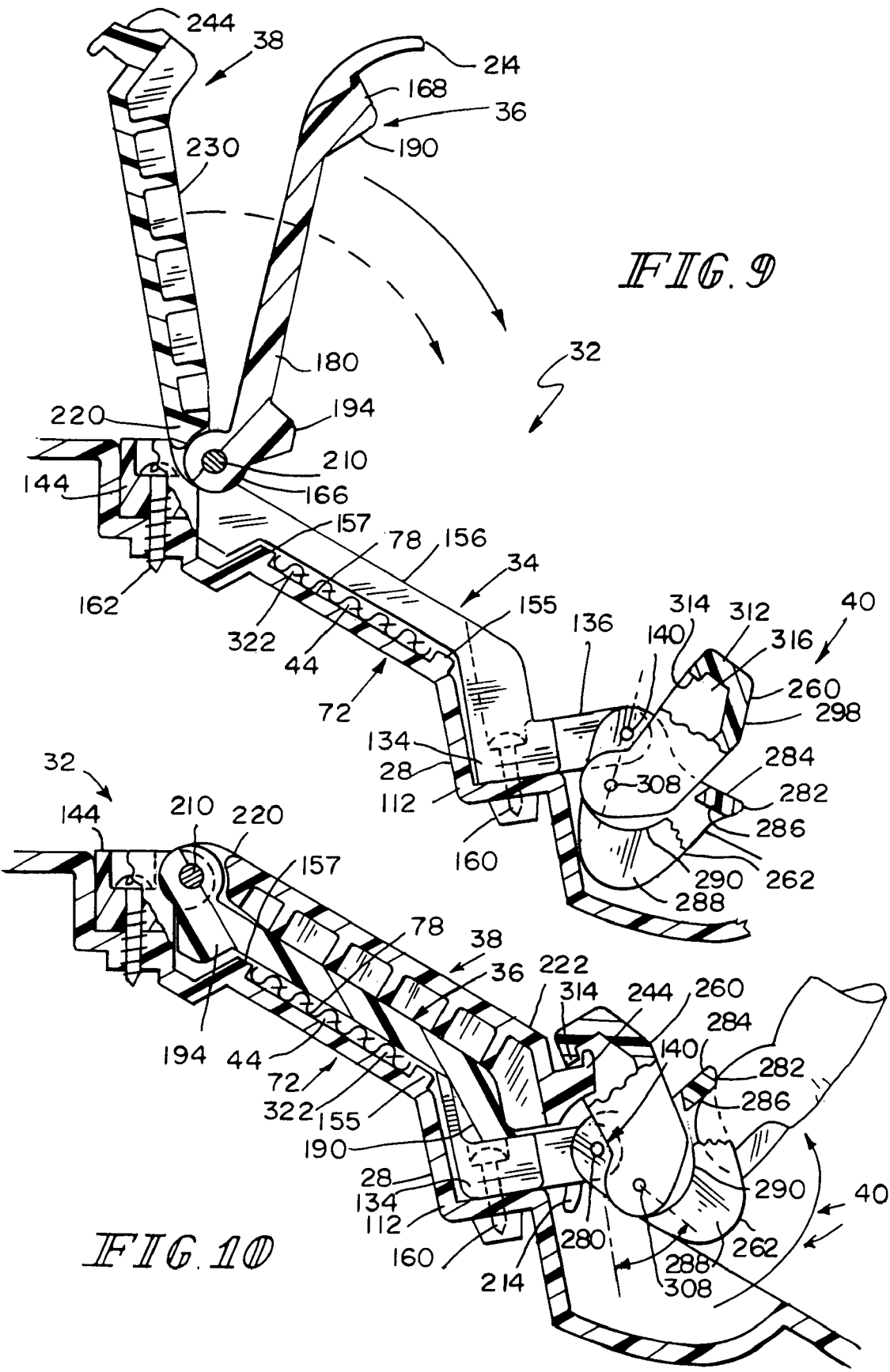

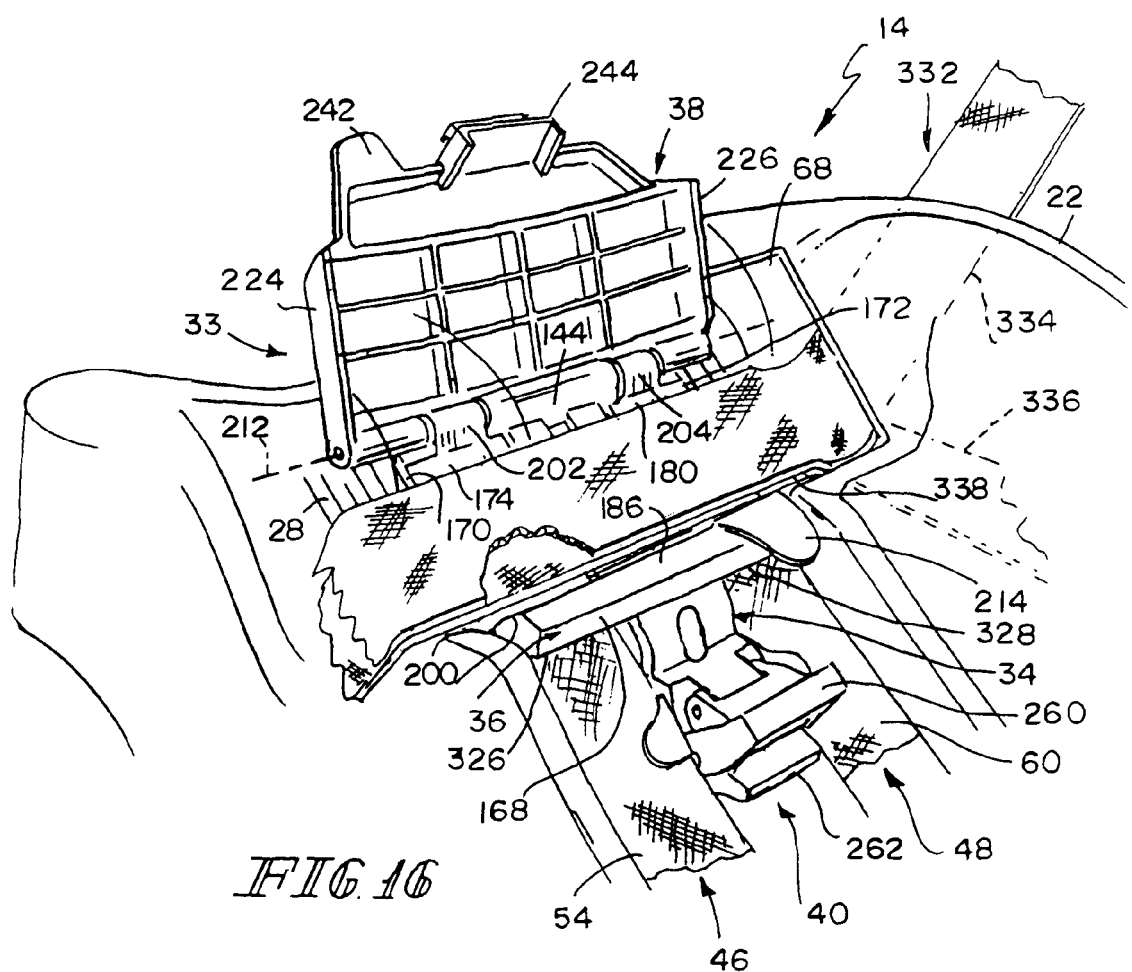

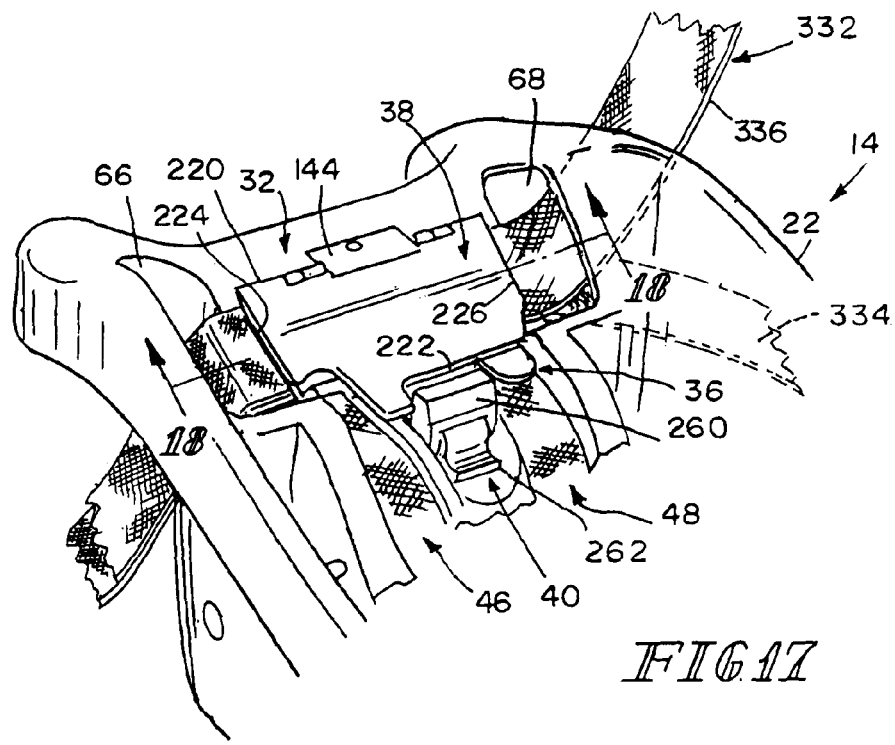
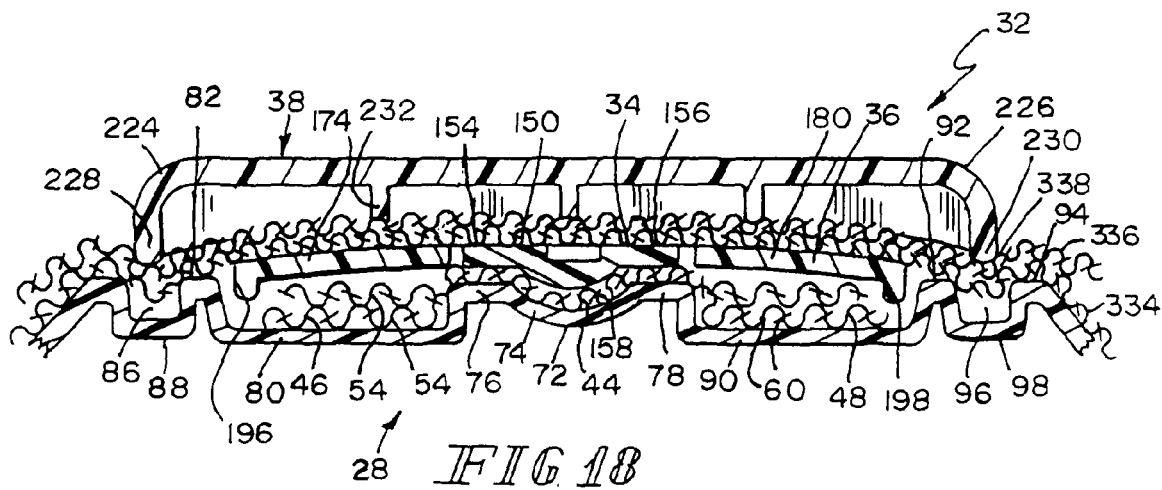

BELT-ANCHOR SYSTEM FOR JUVENILE VEHICLE SEAT

This application claims priority under 35 U.S.C. §119(e) to U.S. Provisional Application Ser. No. 60/970,289, filed Sep. 6, 2007, which is expressly incorporated by reference herein.

BACKGROUND

The present disclosure relates to juvenile vehicle seats, and particularly to lower anchors and tethers for coupling a juvenile vehicle seat to a seat in a vehicle. More particularly, the present disclosure relates to a system for anchoring lower tethers to a seat base for a juvenile vehicle seat.

SUMMARY

According to the present disclosure, a child restraint includes a seat base and juvenile seat configured to be mounted on the seat base. The seat base includes a seat support configured to mate with the juvenile seat and anchor means for anchoring the seat support to stationary fixtures included in a seat in a vehicle to tether the seat support to the vehicle seat.

In the illustrative embodiments, the seat base includes a lower-anchors-and-tethers-for-children (LATCH) system including a seat-base belt with a first anchor belt and a second anchor belt configured to mate with stationary fixtures included in the vehicle seat. Each anchor belt includes a strap and an anchor hook coupled to a free end of the strap. The seat base includes a belt anchor means for anchoring the seat-base belt to a seat support of the seat base when the first and second anchor belts are in a use position and are coupled to the stationary fixtures. The belt anchor means enables rearrangement of the first and second anchor belts from the use position to a stored position when the first and second anchor belts are detached from the stationary fixtures, while anchoring a vehicle belt of the vehicle to the seat support when the first and second anchor belts are in the stored position.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 5 is a perspective view of the belt anchor system in an open position showing the cover and pincher pivoted upward, the lock in a released position, and the LATCH belt lying on top of the foundation and passing underneath the bridge with each end of the LATCH belt threaded through the belt ports;

FIG. 6 is a perspective view of the belt anchor system in a partly closed position showing the cover pivoted upward, the pincher pivoted downward, the lock in the release position, and the LATCH belt lying on top of the foundation, passing underneath the bridge, and underneath the pincher with each end of the LATCH belt threaded through the belt ports;

FIG. 7 is a perspective view of the belt anchor system in a closed unlocked position showing the cover and pincher pivoted downward, the lock in a engaged position, and the LATCH belt lying on top of the foundation, passing underneath the bridge, underneath the pincher, and underneath the cover with each end of the LATCH belt threaded through the belt ports;

FIG. 8 is a perspective view of the belt anchor system in a closed locked position showing the cover and pincher pivoted downward, the lock in a locked position, and the LATCH belt lying on top of the foundation, passing underneath the bridge, underneath the pincher, and underneath the cover with each end of the LATCH belt threaded through the belt ports;

FIG. 9 is an enlarged side view taken generally along line 9-9 of FIG. 5 and FIG. 2 showing the pincher to be moved in a clockwise downward direction, followed by the cover also to be moved in a clockwise downward direction and showing the lock in a released position;

FIG. 10 is an enlarged side view taken generally along line 10-10 of FIG. 7 and FIG. 3 showing the pincher and cover pivoted downward and the lock in the engaged position showing the actuator moved in a counter-clockwise direction by a user's finger positioning the clasp in an engaged position over a clasp receiver on the cover;

FIG. 16 is a perspective view of the belt anchor system in a vehicle belt accepting position showing the pincher pivoted downward, the cover pivoted upward, the lock in the released position, and the LATCH belt in the stored position, and showing a vehicle lap belt and vehicle shoulder belt passing over the top of the bridge, over the first and second paddle top surfaces and threaded through the belt ports;

FIG. 17 is a perspective view of the belt anchor system in a vehicle belt locked position showing the pincher and cover pivoted downward, the lock in the locked position, and the LATCH belt in the stored position, and showing a vehicle lap belt and vehicle shoulder belt passing under the cover and through the belt ports;

FIG. 18 is a side view taken generally along line 18-18 of FIG. 17 showing the LATCH belt passing over the hump, under the bridge and the folded over LATCH belt above the first and second foundation floors and showing the vehicle shoulder and lap belts passing over the first foundation outside ledge, into the first foundation groove under the first cover projection, across the, first foundation inside ledge, on top of the first paddle, bridge, and second paddle, underneath the cover support ribs, across the second foundation inside ledge, into the second foundation groove under the second cover projection, and over the second foundation outside ledge;

DETAILED DESCRIPTION

Figure 1:
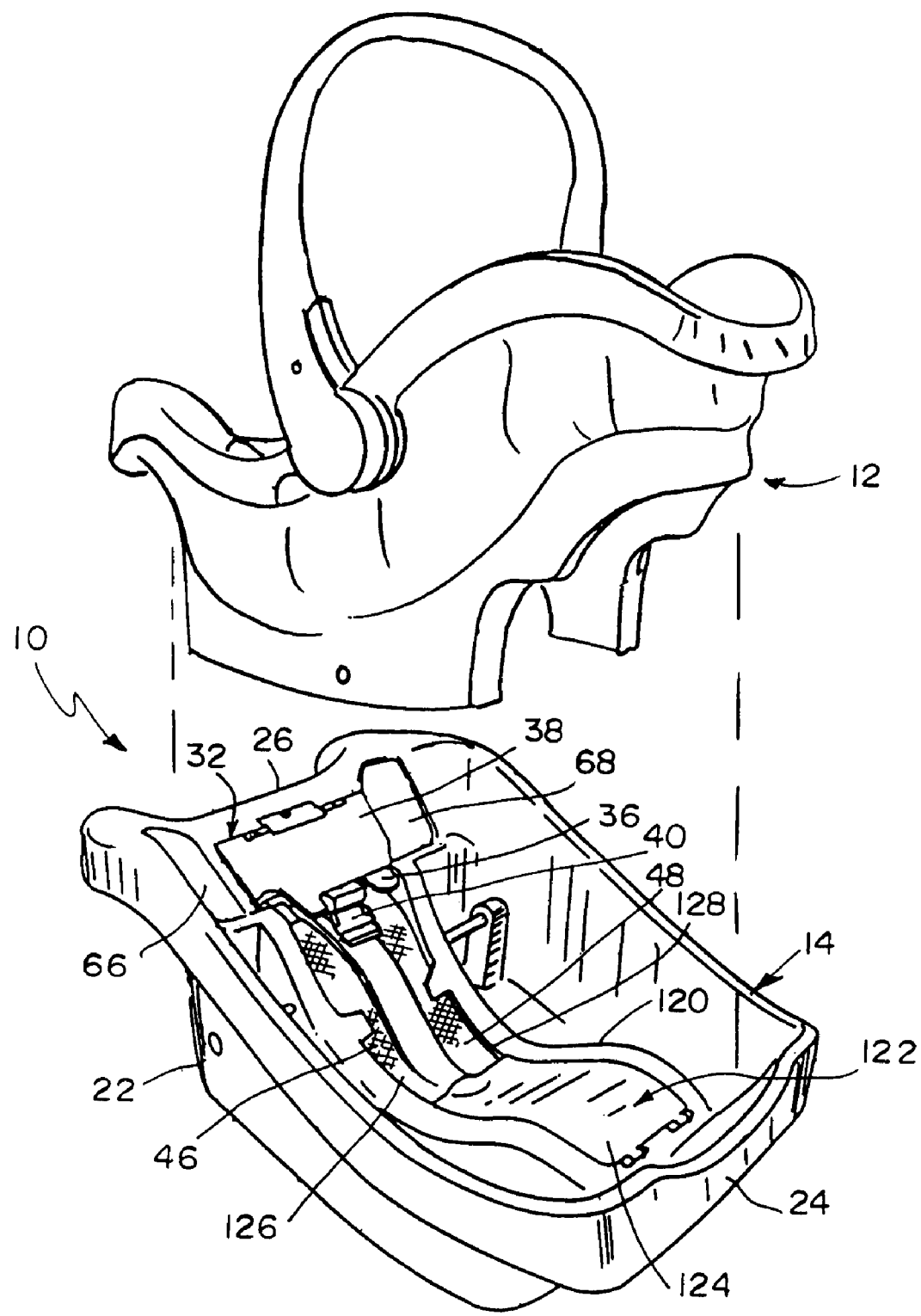
FIG. 1 is a perspective view of a child restraint in accordance with the present disclosure showing a juvenile seat, a seat base including a belt anchor system, a frame, belt ports, a LATCH belt storage compartment, a LATCH belt shown in a stored position inside the LATCH belt storage compartment, and a seat attachment system configured to removably couple the juvenile seat to the seat base.
Figure 2:
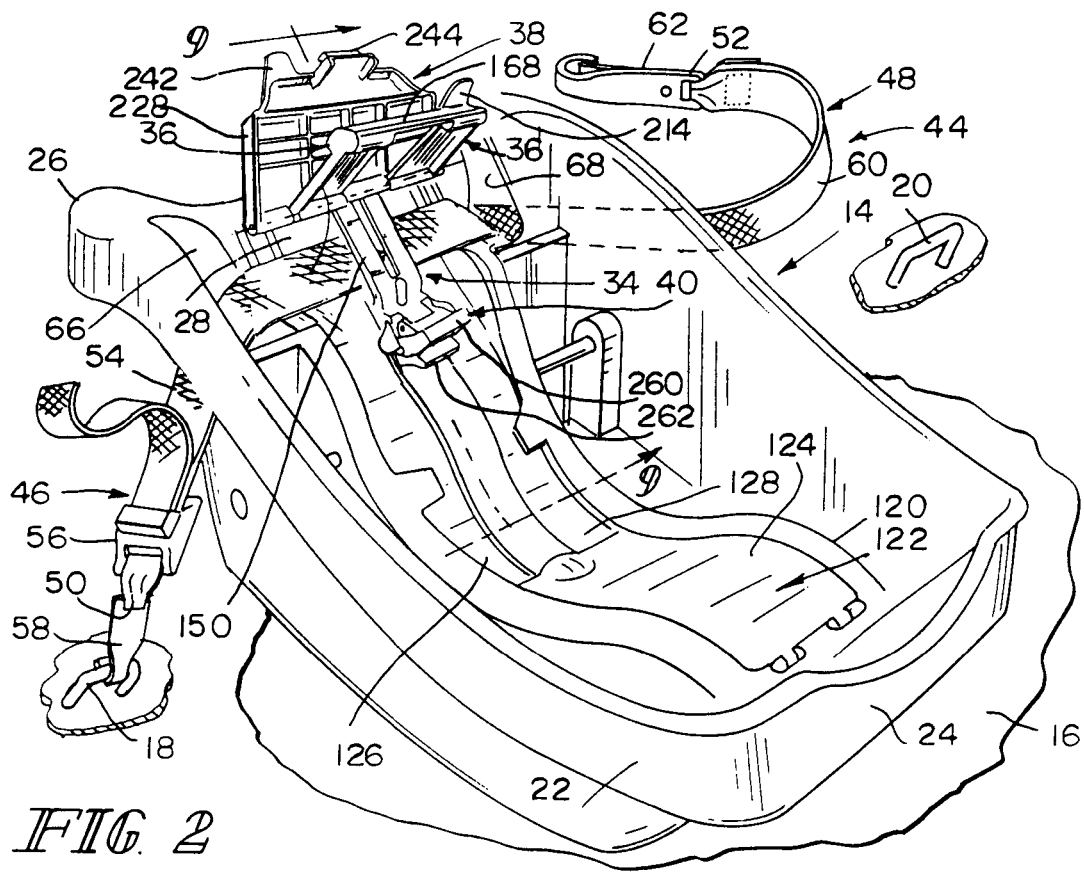
FIG. 2 is a perspective view of the seat base from FIG. 1 showing the LATCH belt in a use position with the ends of the LATCH belt threaded through the belt ports and coupled to a vehicle anchor and showing the belt anchor system in an open position.
Figure 3:
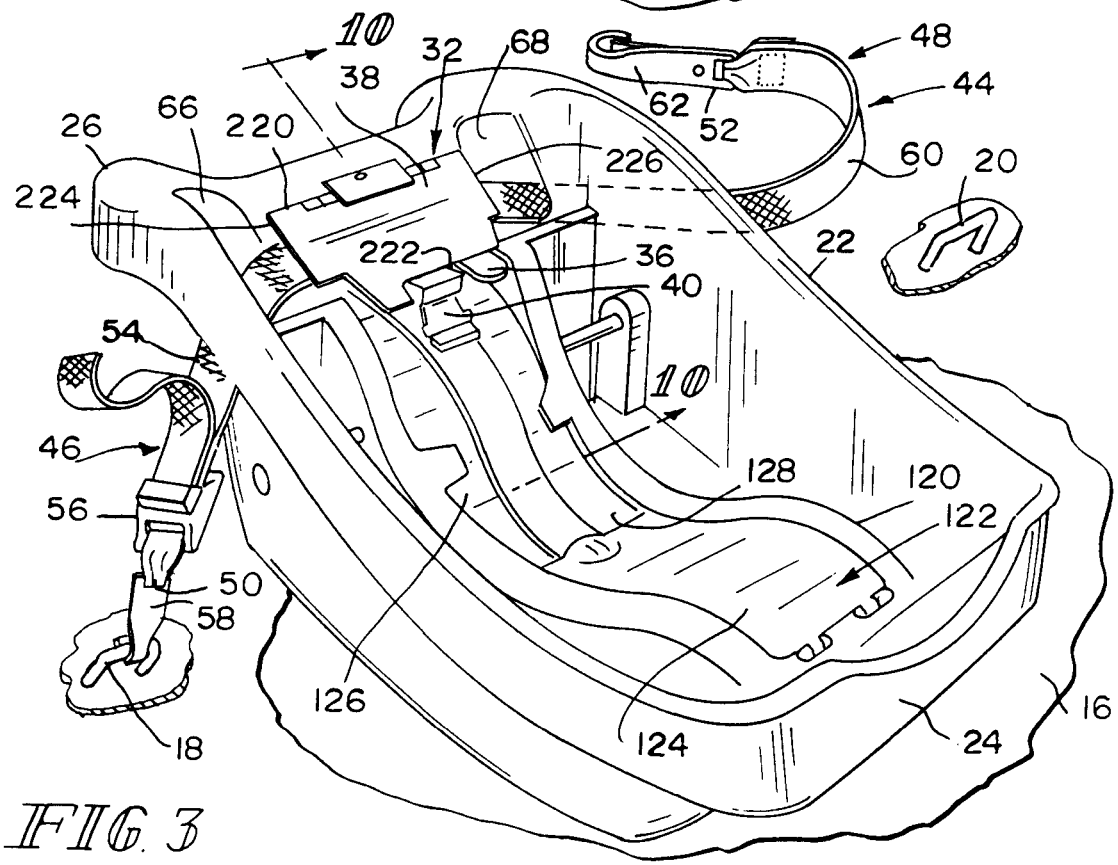
FIG. 3 is a perspective view of the seat base similar to the view shown in FIG. 2 except that the belt anchor system is shown in a closed position.

A child restraint 10 is shown in FIG. 1 including a juvenile seat 12 adapted to be removably mounted to a seat base 14. As shown in FIGS. 2 and 3, seat base 14 is adapted to sit on an underlying vehicle seat 16 and is adapted to be anchored to vehicle seat 16 by attachment of seat base 14 to a first stationary fixture 18 and a second stationary fixture 20 that are associated with vehicle seat 16 and that are stationarily mounted to the vehicle. First stationary fixture 18 and second stationary fixture 20 may, for example, each comprise a generally U-shaped bracket. Seat base 14 includes a seat support 22 having a lower end 24 and an upper end 26. Seat support 22 is generally shell-like and is configured to removably receive juvenile seat 12. Seat support 22 includes a foundation 28 adjacent upper end 26 of seat support 22. Seat base 14 also includes a belt-anchor system 32 attached to seat support 22 adjacent foundation 28 and upper end 26 of seat base 14. Belt anchor system 32 includes a belt support 34, a pivotable pincher plate 36, a pivotable cover plate 38, and a lock 40.

Seat base 14 includes a lower-anchors-and-tethers-for-children (LATCH) system comprising a seat-base belt 44 including a first anchor belt 46 and a second anchor belt 48. First anchor belt 46 extends outwardly from foundation 28 at upper end 26 of seat support 22 to a distal first free end 50. Second anchor belt 48 also extends outwardly from foundation 28 at upper end 26 of seat support 22 to a distal second free end 52. First anchor belt 46 includes a flexible first strap 54 and an anchor member such as a first anchor hook 58 (or other suitable connector) attached to a distal end of first strap 54 at first free end 50. First anchor belt 46 may also include an adjustment mechanism 56 configured to selectively adjust the length of first strap 54. Second anchor belt 42 includes a flexible second strap 60 and an anchor member such as a second anchor hook 62 (or other suitable connector) attached to a distal end of second strap 60 at second free end 52. The proximal ends of the first strap 54 and second strap 60 are attached to one another such that the first and second straps 54 and 60 are formed as one continuous and integral strap member.

Seat support 22 includes a first belt port 66 adjacent upper end 26 of seat base 14 and adjacent a first transverse side of foundation 28 and a second belt port 68 located adjacent upper end 26 and adjacent a second transverse side of foundation 28, such that foundation 28 is located between first belt port 66 and second belt port 68. As shown in FIGS. 2 and 3, first and second anchor belts 46 and 48 are in an end-to-end splayed orientation with the first free end 50 of first anchor belt 46 threaded through first belt port 66 and removably coupled to first stationary fixture 18 by first anchor hook 58. As also suggested by FIGS. 2 and 3, second free end 52 of second anchor belt 48 is threaded through second belt port 68 for coupling to second stationary fixture 20 by the second anchor hook 62. The first anchor belt 46 and second anchor belt 48 are shown in a splayed use position in FIGS. 2 and 3. When first and second anchor belts 46 and 48 are in the use position, seat-base belt 44 extends generally linearly in a transverse direction over foundation 28 of seat support 22.

Figure 4:
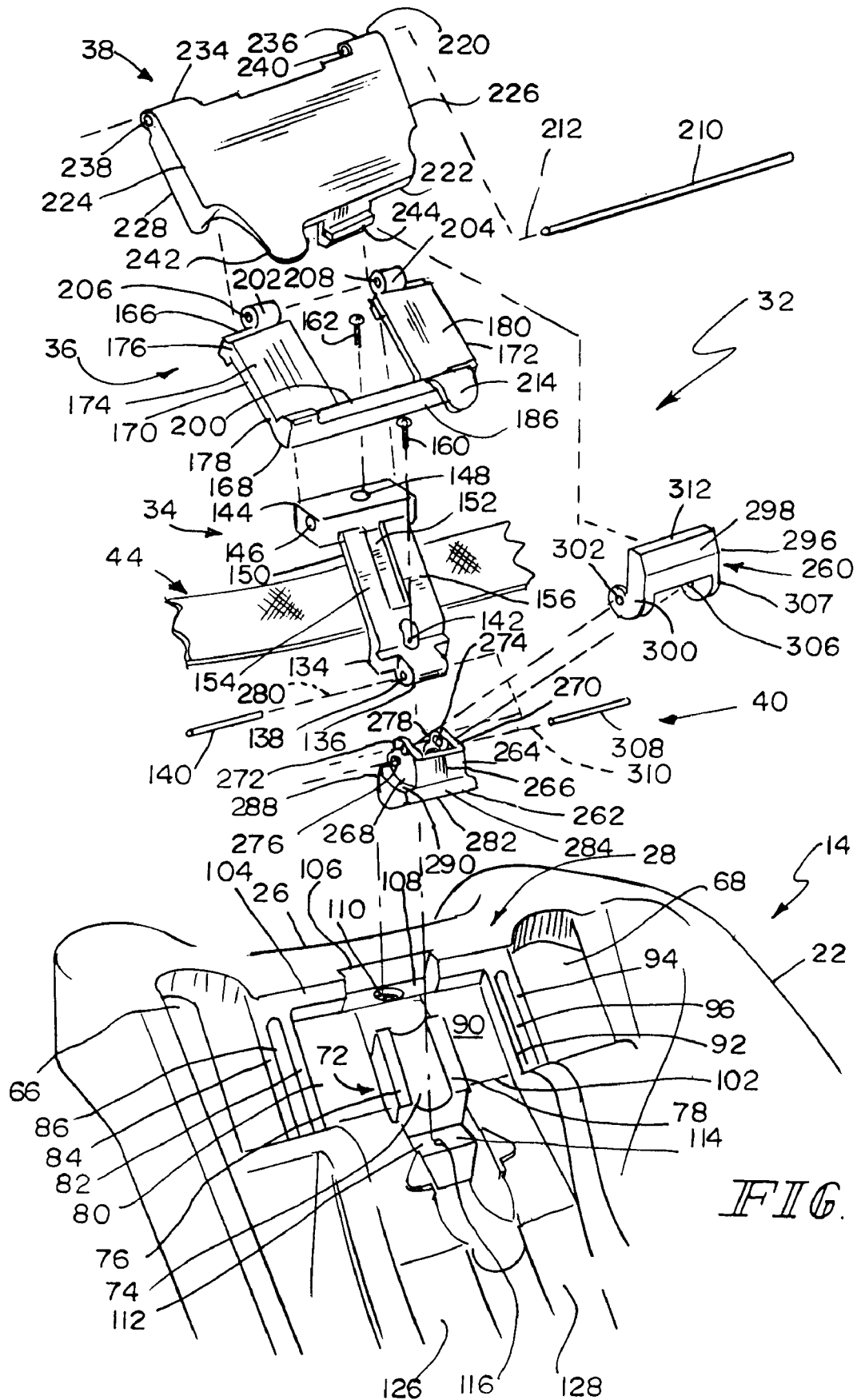
FIG. 4 is an exploded perspective view of the belt anchor system showing a bridge and a foundation, a belt holder including an inner pincher plate and outer cover plate, and a lock including a clasp and an actuator.

As shown in FIG. 4, foundation 28 of seat support 22 includes a center hump 72 having a generally linearly extending longitudinal hump depression 74 located between a generally planar and elongate first hump ledge 76 and a generally planar and elongate second hump ledge 78. Hump depression 74 is generally concavely curved as a portion of a cylinder. A generally planar first foundation floor 80 extends transversely outwardly from center hump 72 adjacent first hump ledge 76 to a generally linear and longitudinally extending first foundation inside ledge 82. A generally linear and longitudinally extending first foundation outside ledge 84 is located transversely outwardly and spaced apart from first foundation inside ledge 82. An elongate generally linear and longitudinally extending first foundation groove 86 having a bottom wall 88 is located between first foundation inside ledge 82 and first foundation outside ledge 84. First foundation outside ledge 84 is located adjacent first belt port 66.

Foundation 28 also includes a generally planar second foundation floor 90 extending transversely outwardly from center hump 72 adjacent second hump ledge 78 to a generally linear and longitudinally extending second foundation inside ledge 92. A generally linear and longitudinally extending second foundation outside ledge 94 is located transversely outwardly and spaced apart from second foundation inside ledge 92. An elongate generally linear and longitudinally extending second foundation groove 96 having a bottom wall 98 is located between second foundation inside ledge 92 and second foundation outside ledge 94. Second foundation outside ledge 94 is located adjacent second belt port 68.

First and second foundation floors 80 and 90, first and second foundation inside ledges 82 and 92, first and second foundation outside ledges 84 and 94, first and second foundation grooves 86 and 96, and bottom walls 88 and 98 extend generally linearly and longitudinally from a bottom end 102 to a top end 104 of foundation 28 and parallel to one another. First and second hump ledges 76 and 78, first and second foundation inside ledges 82 and 92, first and second foundation outside ledges 84 and 94 extend generally parallel to one another and are generally coplanar. First and second foundation floors 80 and 90 and bottom walls 88 and 98 are generally coplanar with one another. Seat support 22 includes an upper receiver 106 at top end 104 of foundation 28 in the form of a receptacle having a floor 108 with an aperture 110. Seat support 22 also includes a lower receiver 112 in the form of a receptacle located adjacent bottom end 102 of foundation 28 and having a floor 114 with an aperture 116. Center hump 72 is located in longitudinal alignment between upper receiver 106 and lower receiver 112.

Seat base 14 includes a housing 120 attached to and within seat support 22. Housing 120 extends from lower end 24 of seat support 22 to foundation 28 of seat support 22. The lower end of the housing 120 includes a storage compartment 122 having a hollow interior region and a pivotable door 124. A first channel 126 is formed in the top of housing 120. A bottom end of first channel 126 is in communication with the interior region of storage compartment 122. A second channel 128 is formed in the top of housing 120, generally parallel to first channel 126, having a lower end in communication with the interior region of storage compartment 122. When first anchor hook 58 of first anchor belt 46 is detached from first stationary fixture 18, first free end 50 of first anchor belt 46 may be stored within the interior region of storage compartment 122 in a stored position. First strap 54 of first anchor belt 46 is placed in first channel 126 when first anchor belt 46 is in the stored position. Similarly, when second anchor hook 62 of second anchor belt 48 is detached from second stationary fixture 20, second free end 52 of second anchor belt 48 may be placed within the interior region of storage compartment 122 in a stored position. Second strap 60 of second anchor belt 48 is placed within second channel 128 when second anchor belt 48 is in the stored position.

Belt support 34 of belt-anchor system 32 includes a lower bridge mount 134 having an outwardly extending lock receiver 136. Lock receiver 136 includes a transversely extending horizontal bore 138 configured to receive a pivot rod 140. Lower bridge mount 134 also includes a generally vertical bore 142. Belt support 34 includes an upper bridge mount 144 having a generally linear and horizontal transverse bore 146 and a vertical bore 148 extending through upper bridge mount 144. A bridge 150 extends between lower bridge mount 134 and upper bridge mount 144 such that lower bridge mount 134 is attached to a bottom end of bridge 150 and upper bridge mount 144 is attached to an upper end of bridge 150. The top of bridge 150 includes a central longitudinal groove 152 located between an elongate generally planar first bridge ledge 154 and an elongate generally planar second bridge ledge 156. First bridge ledge 154 and second bridge ledge 156 each include an upwardly extending lower belt retainer 155 and a spaced apart upwardly extending upper belt retainer 157. The bottom of the bridge 150 includes an elongate generally convexly curved hump 158.

Lower bridge mount 134 is received within lower receiver 112 such that bore 142 is coaxially aligned with aperture 116. Lower bridge mount 134 is coupled to lower receiver 112 by a fastener 160, such as a threaded screw, that extends through bore 142 and aperture 116. Upper bridge mount 134 is received within upper receiver 106 of seat support 22 such that bore 148 is coaxially aligned with aperture 110. Upper bridge mount 144 is coupled to upper receiver 106 by a fastener 162, such as a threaded screw, that extends through bore 148 and aperture 110. Bridge 150 extends longitudinally over and spaced apart above center hump 72 of foundation 28. Hump 158 on the bottom of bridge 150 is aligned with hump depression 74 in center hump 72 of foundation 28. First bridge ledge 154 is aligned with and is spaced apart from and above first hump ledge 76, and second bridge ledge 156 is aligned with and is spaced apart and above second hump ledge 78.

Pincher plate 36 extends longitudinally between a first end 166 and a second end 168 and transversely between a first side 170 and a second side 172. Pincher plate 36 includes a first paddle 174 having a proximal end 176 and a distal end 178. Pincher plate 36 also includes a second paddle 180 having a proximal end 182 and a distal end 184. Second paddle 180 is spaced apart from, and is generally parallel to and coplanar with, first paddle 174. Proximal ends 176 and 182 of first and second paddles 174 and 180 are located at first end 166 of pincher plate 36 and distal ends 178 and 184 of first and second paddles 174 and 180 are located at second end 168 of pincher plate 36. A paddle connector 186 extends between first paddle 174 and second paddle 180 at distal ends 178 and 184 such that second paddle 180 is connected to first paddle 174 at distal ends 178 and 184.

A first outer lower-belt retainer 188 extends downwardly and outwardly from the bottom of first paddle 174 at distal end 178. A second outer lower-belt retainer 190 extends downwardly and outwardly from the bottom of second paddle 180 at distal end 184. A first inner lower-belt retainer 192 extends downwardly and outwardly from the bottom of first paddle 174 at proximal end 176. A second inner lower-belt retainer 194 extends downwardly and outwardly from the bottom of second paddle 180 at proximal end 182. A first paddle projection 196 extends linearly along first side 170 of pincher plate 36 and downwardly from the bottom of first paddle 174. A second paddle projection 198 extends generally linearly along second side 172 of pincher plate 36 and downwardly from the bottom of second paddle 180. An outer upper-vehicle belt retainer 200 extends generally linearly along second end 168 of pincher plate 36 and upwardly from a top of pincher plate 36. Outer upper-vehicle belt retainer 200 extends along distal ends 178 and 184 of first paddle 174 and second paddle 180 and along paddle connector 186. A first inner upper-vehicle belt retainer 202 is attached to proximal end 176 of first paddle 174 at first end 166 of pincher plate 36. A second inner upper-vehicle belt retainer 204 is attached to proximal end 182 of second paddle 180 at first end 166 of pincher plate 36. First inner upper-vehicle belt retainer 202 includes a transverse bore 206 and second inner upper-vehicle belt retainer 204 includes a transverse bore 208 coaxially aligned with bore 206.

Figure 5:
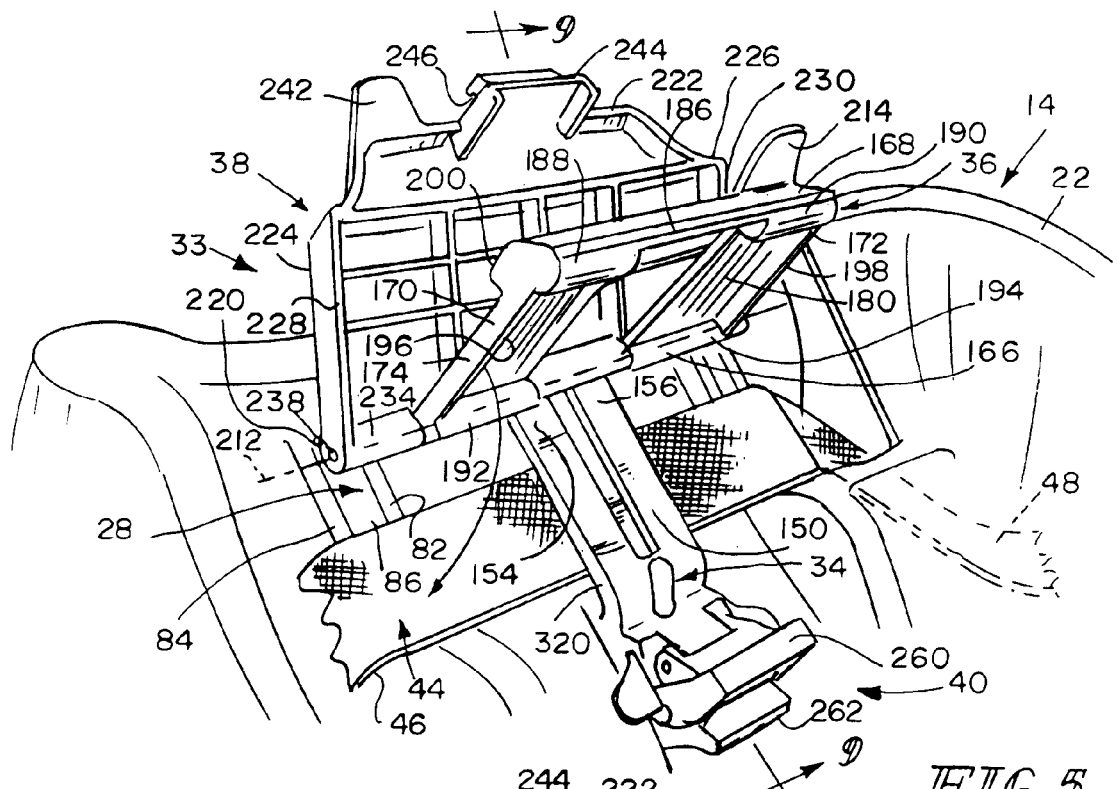
FIGS. 5-8 is a sequence of views showing the belt anchor system being operated.
Figure 6:
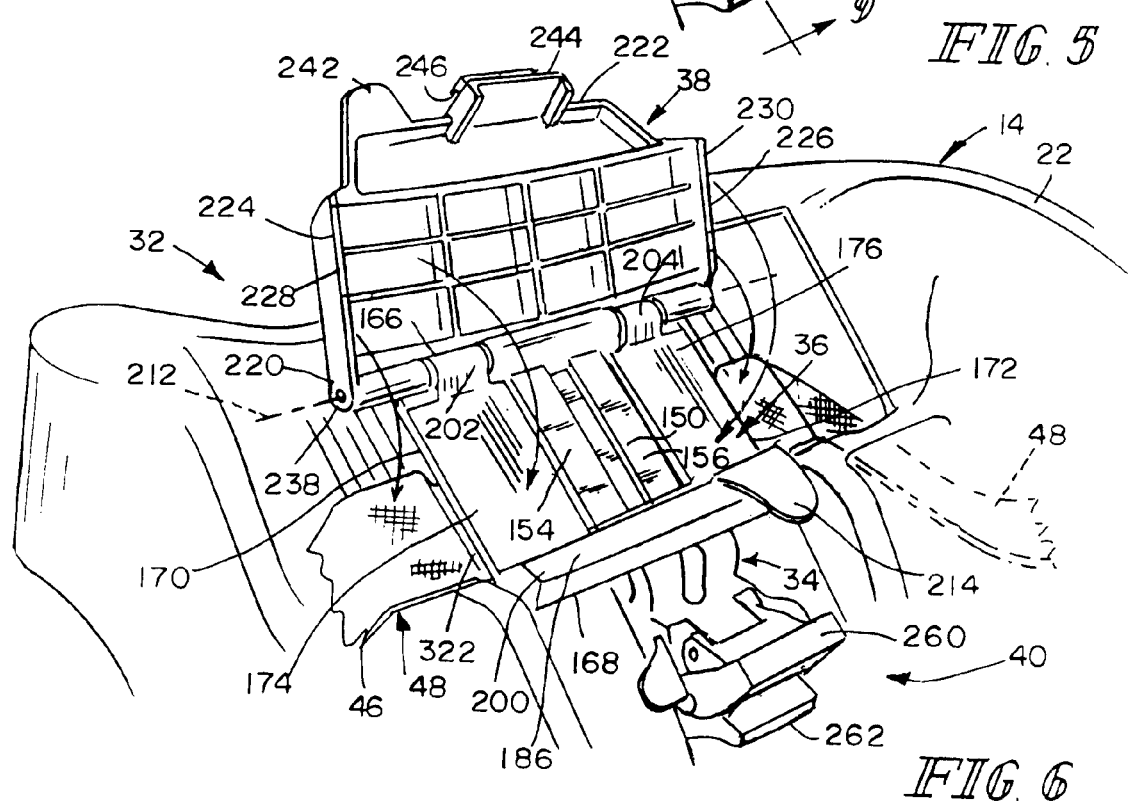

Upper bridge mount 144 is located between proximal ends 176 and 182 of first paddle 174 and second paddle 180 such that bores 206 and 208 of pincher plate 36 are coaxially aligned with bore 146 of upper bridge mount 144. A pivot rod 210 extends through bores 206 and 208 of pincher plate 36 and through bore 146 of upper bridge mount 144 such that first end 166 of pincher plate 36 is pivotably coupled to upper bridge mount 144 and thereby to seat support 22 for pivotable movement about a pivot axis 212. Pivot rod 210 is generally parallel to pivot rod 140. First end 166 of pincher plate 36 is pivotably attached to seat support 22 for selective pivotable movement of pincher plate 36 about pivot axis 212 between an open position as shown in FIG. 5 and a closed position as shown in FIG. 6. A handle 214 is attached to second end 168 of pincher plate 36 adjacent distal end 184 of second paddle 180. Handle 214 is configured to facilitate manual movement of pincher plate 36 between the open and closed positions.

Figure 12:
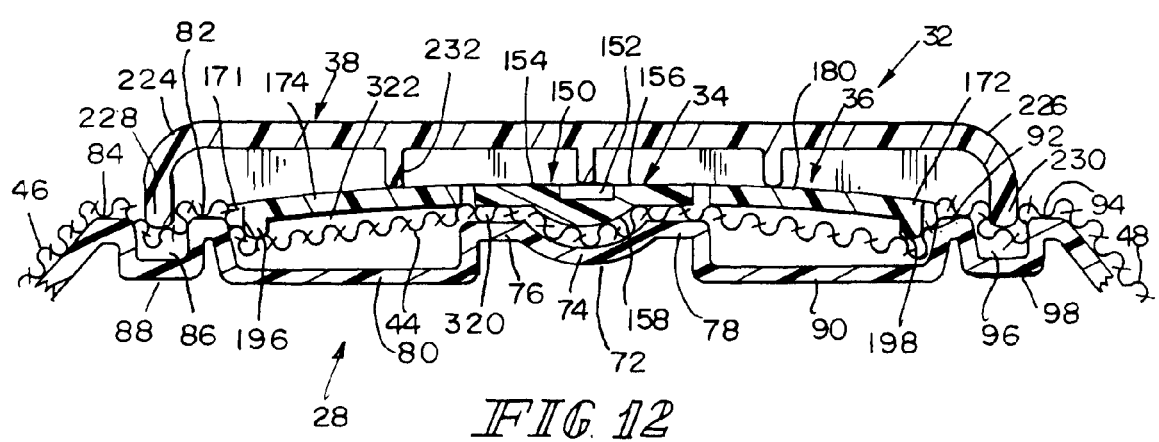
FIG. 12 is a side view taken generally along line 12-12 of FIG. 11 showing the foundation to include first and second foundation outside ledges, first and second foundation grooves, first and second foundation inside ledges, first and second foundation floors, a hump including a first and second hump ledge and a hump groove, showing the bridge to include a bridge top surface, bridge bottom surface, and a bridge depression, showing the pincher to include a first and second paddle top surfaces, first and second paddle bottom surfaces, and first and second paddle projections extending downward, showing the cover to include a cover top surface, cover bottom surface, cover support ribs, and first and second cover projections extending downward, showing the LATCH belt passing over the first foundation outside ledge, into the first foundation groove under the first cover projection, over the first foundation inside ledge, under the first paddle projection, above the first foundation floor, over the first hump ledge, into the hump groove under the bridge depression, over the second hump ledge, above the second foundation floor, under the second paddle projection, over the second foundation inside ledge, into the second foundation groove under the second cover projection, and over the second foundation outside ledge and showing the cover support ribs in contact with the first and second paddle top surfaces.

As shown in FIGS. 6 and 12, when pincher plate 36 is in the closed position, second end 168 of pincher plate 36 is located adjacent bottom end 102 of foundation 28 such that pincher plate 36 overlies foundation 28. When pincher plate 36 is in the closed position, center hump 72 of foundation 28 is located between first paddle 174 and second paddle 180 of pincher plate 36 with the top surface of first paddle 174 generally aligned with the top surface of first hump ledge 76 and the top surface of second paddle 180 generally aligned with the top surface of second hump ledge 78. First paddle projection 196 extends along and adjacent to first foundation inside ledge 82 and second paddle projection 198 extends along and adjacent to second foundation inside ledge 92 when pincher plate 36 is in the closed position. First paddle 174 overlies first foundation floor 80 of foundation 28 in a spaced relationship and second paddle 180 overlies second foundation floor 90 of foundation 28 in a spaced relationship when pincher plate 36 is in the closed position.

Cover plate 38 extends longitudinally between a first end 220 and a second end 22 and transversely between a first side 224 and a second side 226. A generally linear first cover projection 228 extends downwardly from a bottom of cover plate 38 and along first side 224 between first end 220 and second end 222. A generally linear second cover projection 230 extends downwardly from the bottom of cover plate 38 and along second side 226 between first end 220 and second end 222. A plurality of ribs 232 extend downwardly from the bottom of cover plate 38. A first cover mount 234 and a second cover mount 236 are attached to first end 220 of cover plate 38. First cover mount 234 and second cover mount 236 are spaced apart from one another such that first cover mount 234 is located adjacent to first side 224 and second cover mount 236 is located adjacent second side 226 of cover plate 38. First cover mount 234 includes a transverse bore 238 and second cover mount 236 includes a transverse bore 240 that is coaxially aligned with bore 238. First cover mount 234 is configured to be located adjacent to and outwardly from first inner upper-vehicle belt retainer 202 of pincher plate 36 such that bore 238 is coaxially aligned with bore 206. Second cover mount 236 is configured to be located adjacent to and outwardly from second inner upper-vehicle belt retainer 204 of pincher plate 36 such that bore 240 is coaxially aligned with bore 208.

Figure 7:
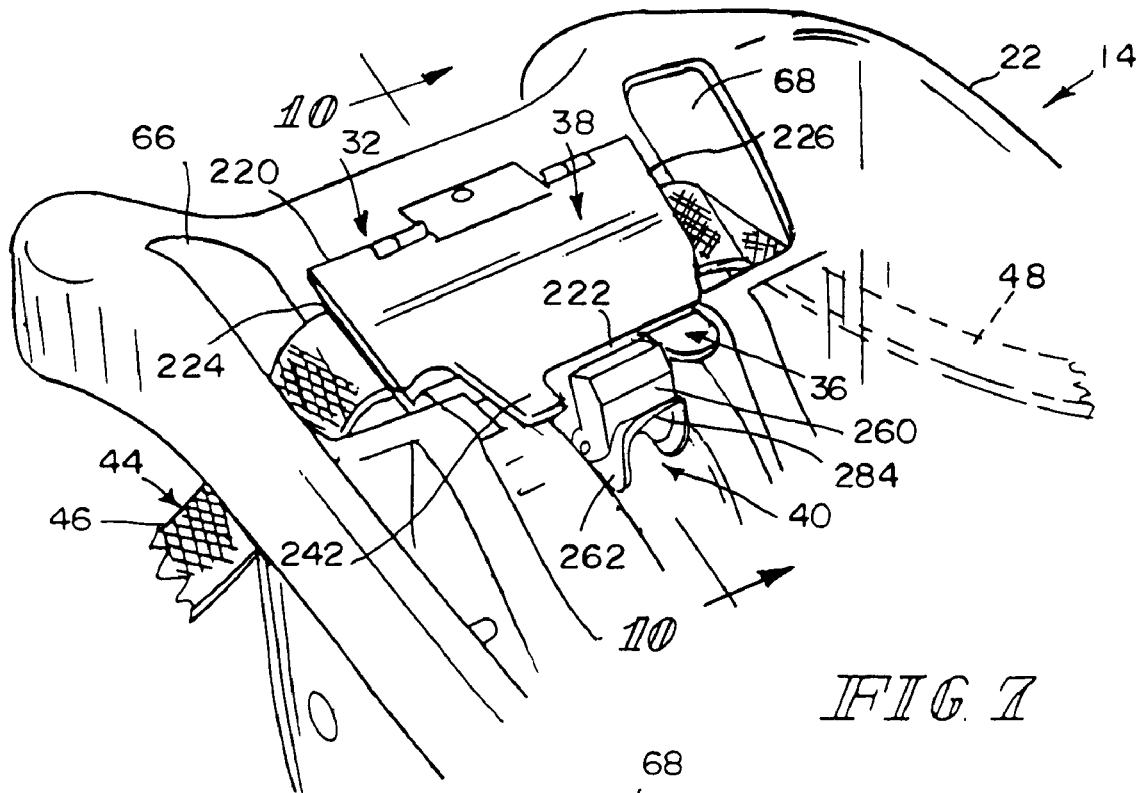

Pivot rod 210 extends through bores 238 and 240 of cover plate 38 and through bores 206 and 208 of pincher plate 36. First end 220 of cover plate 38 is thereby pivotably coupled to pincher plate 38, belt support 34, and seat support 22 by pivot rod 210 such that cover plate 38 is selectively pivotable about pivot axis 212 between an open position as shown in FIGS. 5 and 6 and a closed position as shown in FIG. 7. A handle 242 is attached to second end 222 of cover plate 38 to facilitate manual movement of cover plate 38 between the open and closed positions. A clasp receiver 244 is attached to second end 222 of pincher plate 36. Clasp receiver 244 includes a leg 250 that extends downwardly from second end 222 of cover plate 38. A foot 252 extends outwardly from leg 250 and includes an upwardly and transversely extending lip 246 at the outer end of foot 252 forming a slot 248 with leg 250.

Lock 40 includes a clasp 260 and an actuator 262. Actuator 262 includes a body 264 having an end wall 266, a first actuator mount 268 and a second actuator mount 270. First and second actuator mounts 268 and 270 extend outwardly from opposite transverse ends of end wall 266 generally parallel to one another. A transverse first upper bore 272 extends through an upper end of first actuator mount 268. A transverse second upper bore 274 extends through an upper end of second actuator mount 270 and is coaxially aligned with first upper bore 272. A transverse first lower bore 276 extends through a lower end of first actuator mount 268. A transverse second lower bore 278 extends through a lower end of second actuator mount 270 and is coaxially aligned with first lower bore 276. The first and second actuator mounts 268 and 270 are configured to be located at opposite transverse ends of lock receiver 136 of belt support 34 with first and second upper bores 272 and 274 coaxially aligned with bore 138 of lock receiver 136. Pivot rod 140 extends through first and second upper bores 272 and 274 of actuator 262 and bore 138 of lock receiver 136 such that actuator 262 is pivotably coupled to belt support 34 and thereby to seat support 22 by pivot rod 140 for selective pivotable movement about a pivot axis 280 between a locked position and an unlocked position.

A grip member 282 having an upper grip 284 and a lower grip 286 extends outwardly from the bottom end of end wall 266. Upper grip 284 is configured to facilitate manual pivotable movement of actuator 262 from the unlocked position to the locked position. Lower grip 286 is configured to facilitate manual movement of actuator 262 from the locked position to the unlocked position. A first ear 288 extends transversely outwardly from the bottom end of first actuator mount 268 and includes a generally concavely curved top wall 290 that extends from the bottom end of end wall 266 along the bottom end of first actuator mount 268 and transversely outwardly from first actuator mount 268. A second ear extends transversely outwardly from the bottom end of second actuator mount 270 and includes a generally concavely curved top wall that extends from the bottom end of end wall 266 along the bottom end of second actuator mount 270 and transversely outwardly from second actuator mount 270. The second ear is formed in the same manner as first ear 288, except the second ear is opposite hand.

Clasp 260 includes a body 296 having a front wall 298, a first clasp mount 300 extending downwardly from the bottom of front wall 298 at a first side and a second clasp mount 302 extending downwardly from the bottom end of front wall 298 at a second side of front wall 298. First clasp mount 300 includes a transverse first bore 304 and second clasp mount 302 includes a transverse second bore 306 coaxially aligned with first bore 304. First clasp mount 300 is located outwardly from and adjacent first actuator mount 268 such that first bore 304 of first clasp mount 300 is coaxially aligned with first lower bore 276 of first actuator mount 268. Second clasp mount 302 is located outwardly from and adjacent second actuator mount 270 such that second bore 306 is located coaxially with second lower bore 278 of second actuator mount 270. A pivot rod 308 extends through first and second bores 304 and 306 of first and second clasp mounts 300 and 302 and through first and second lower bores 276 and 278 of first and second actuator mounts 268 and 270 such that clasp 260 is pivotably coupled to actuator 262 for pivotable movement about a pivot axis 310. Clasp 260 is also conjointly pivotable with actuator 262 about pivot axis 280. Clasp 260 is pivotable between an extended position and a retracted position. A clasp overhang 312 extends inwardly from a top end of front wall 298 and includes a downwardly extending lip 314 forming a slot 316 with front wall 298. As shown is FIG. 11, when clasp 260 is in the extended position, lip 314 of clasp overhang 312 is located in slot 248 of clasp receiver 244, and lip 246 of clasp receiver 244 is located in slot 316 of clasp overhang 312, such that clasp overhang 312 is in interlocking engagement with clasp receiver 244. Clasp overhang 312 is disengaged from clasp receiver 244 when clasp 260 is in the retracted position.

Pincher plate 36 and cover plate 38 are shown in FIG. 5 in their open positions. Seat-base belt 44 extends through a belt passageway 320 formed between foundation 28 and bridge 150 and transversely across foundation 28 from first belt port 66 to second belt port 68. First anchor belt 46 is threaded through first belt port 66 and second anchor belt 48 is threaded through second belt port 68 such that first and second anchor belts 46 and 48 are in their use positions. As shown in FIG. 6, pincher plate 36 is pivoted to the closed position such that pincher plate 36 overlies foundation 28. A transverse anchor belt passageway 322 is formed between the bottom of pincher plate 36 and foundation 28 that extends from first side 170 to second side 172 of pincher plate 36. Seat-base belt 44 extends generally linearly and transversely through transverse anchor belt passageway 322 as shown in FIG. 6 when first and second anchor belts 46 and 48 are in the use position. Belt passageway 320 forms a portion of transverse anchor belt passageway 322.

As shown in FIGS. 7 and 10, cover plate 38 is pivoted to the closed position wherein cover plate 38 overlies pincher plate 36. Clasp 260 and actuator 262 of lock 40 are pivoted about pivot axis 280 to place clasp 260 in interlocking engagement with clasp receiver 244 of cover plate 38. Clasp 260 is placed in interlocking engagement with clasp receiver 244 by manually pressing upwardly on lower grip 286 of grip member 282 and pivoting actuator 262 and clasp 260 in the counter-clockwise direction about pivot axis 280 as shown in FIG. 10. As clasp 260 and actuator 262 are pivoted about pivot axis 280 in a counter-clockwise direction, clasp 260 is blocked from pivoting about pivot axis 308 with respect to actuator 262 in a clock-wise direction as shown in FIG. 10 by engagement of first and second clasp mounts 300 and 302 with top walls of first and second ears of actuator 262. Actuator 262 may thereby force clasp 260 into engagement with clasp receiver 244 when actuator 262 is rotated in the counter-clockwise direction about pivot axis 280.

Figure 8:
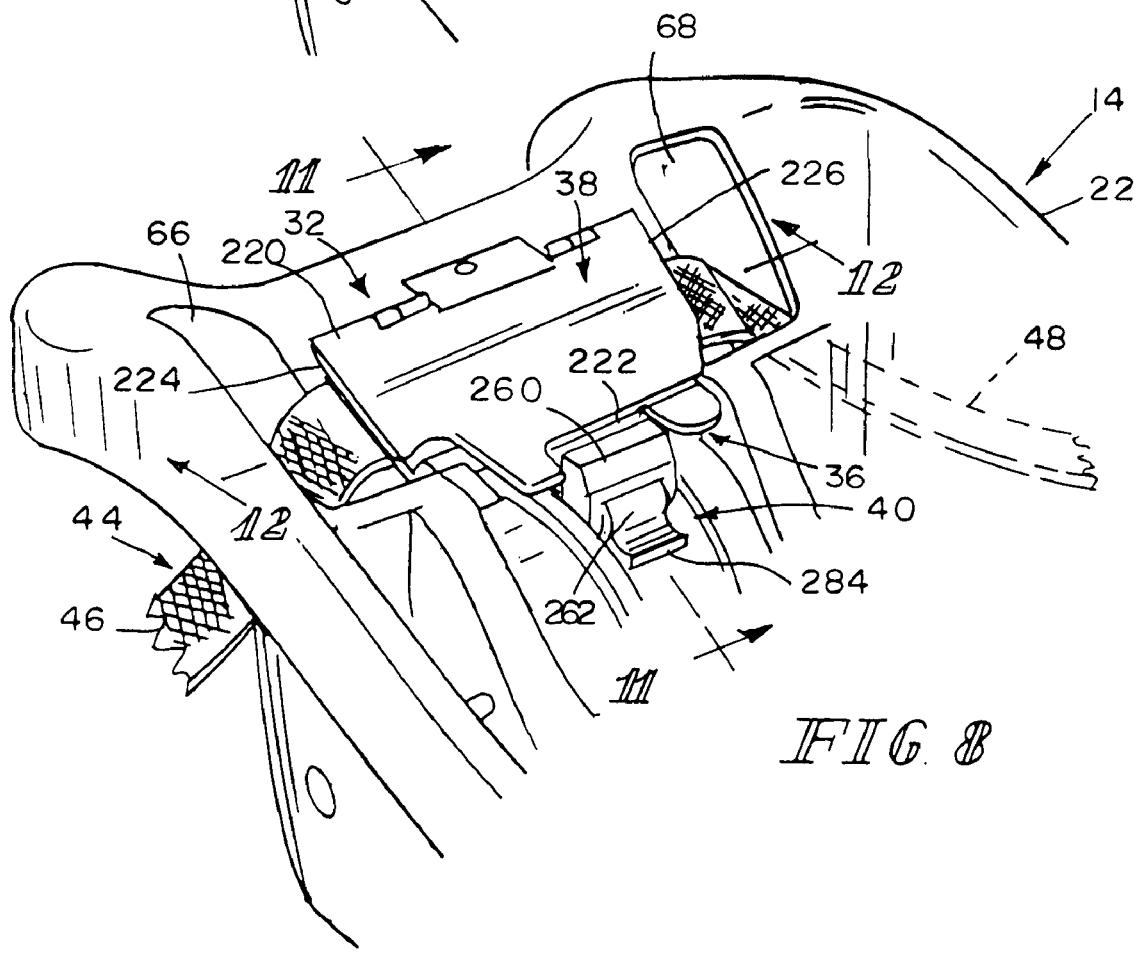
Figure 11:
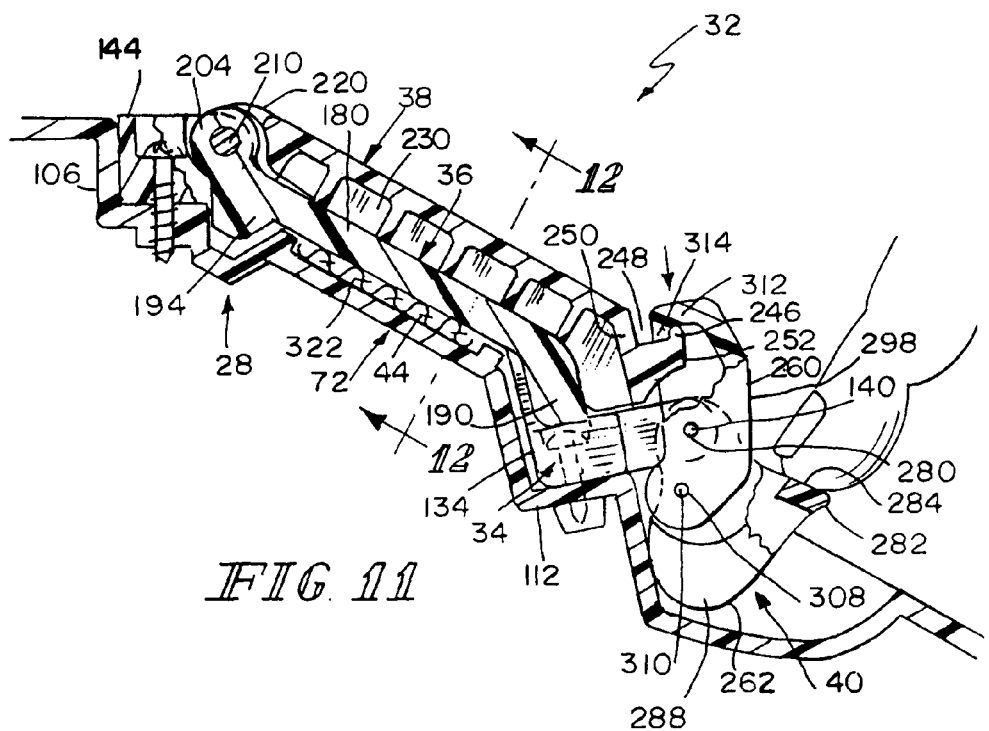
FIG. 11 is an enlarged side view taken generally along line 11-11 of FIG. 8 showing the pincher and cover pivoted downward and the lock in the locked position showing the actuator pushed downward by a user's finger causing the clasp to move downward on the clasp receiver.

As shown in FIGS. 8 and 11, after the clasp 260 is in interlocking engagement with clasp receiver 244, upper grip 284 of grip member 282 is pressed downwardly to pivot actuator 262 in a clock-wise direction as shown in FIG. 11 about pivot axis 310 such that pincher plate 36 and cover plate 38 are in their closed positions and are locked in their closed positions by lock 40. Clasp 260 and actuator 262 form an over-center linkage that retains actuator 262 and clasp 260 in the locked position until manually moved to the unlocked position. When cover plate 38 is in the closed position, transverse anchor belt passageway 322 extends outwardly from first end 170 of pincher plate 36 and between first side 224 of cover plate 38 and foundation 28, and from second side 172 of pincher plate 36 between second side 226 of cover plate 38 and foundation 28 such that transverse anchor belt passageway 322 extends from first foundation outside ledge 84 to second foundation outside ledge 94 of foundation 28.

As shown in FIG. 12, when pincher plate 36 and cover plate 38 are in their closed and locked positions, first paddle projection 196 of pincher plate 36 presses first anchor belt 46 into engagement with first foundation inside ledge 82 of foundation 28, and first cover projection 228 of cover plate 38 presses first anchor belt 46 into first foundation ledge groove 86 and into engagement with first foundation inside ledge 82 and first foundation outside ledge 84. Similarly, second paddle projection 198 of pincher plate 36 presses second anchor belt 48 into engagement with second foundation inside ledge 92 of foundation 28, and second cover projection 230 of cover plate 38 presses second anchor belt 48 into second foundation ledge groove 96 and into engagement with second foundation inside ledge 92 and second foundation outside ledge 94. First and second anchor belts 46 and 48 are thereby anchored to seat support 22. Pincher plate 36 and cover plate 38 may be released from the closed and locked positions by manually pressing upwardly on lower grip 286 of grip member 282 to pivot actuator 262 in a counter-clockwise direction from that shown in FIG. 11 about pivot axis 280.

Figure 13:
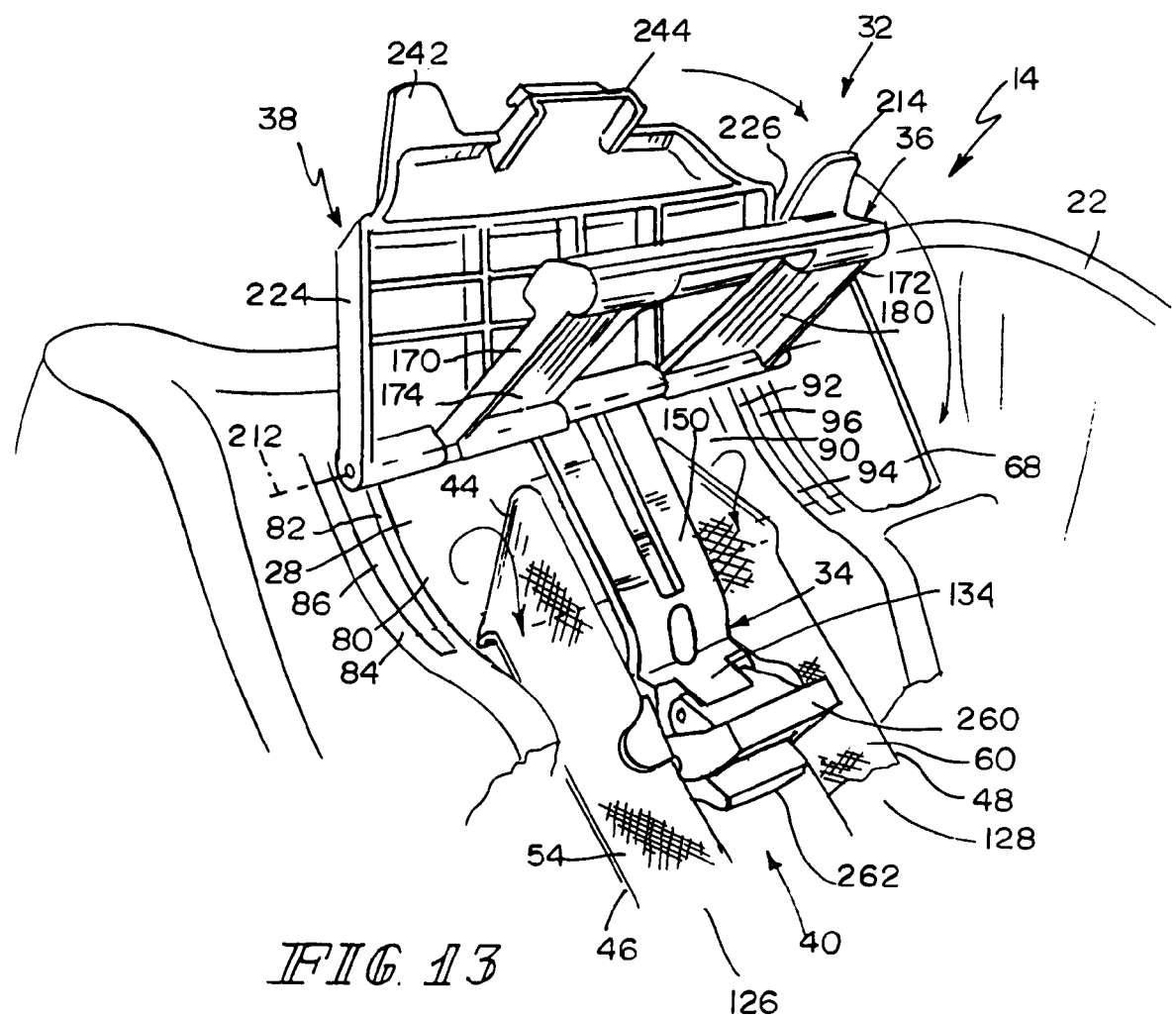
FIG. 13 is a perspective view of the belt anchor system in an open position and the LATCH belt in a stored position showing the cover and pincher pivoted upward, the lock in a released position, and showing the LATCH belt folded ninety degrees above the first and second foundation floor and the LATCH belt passing through first and second lock-out storage exits and entering the LATCH belt storage compartment.
Figure 14:
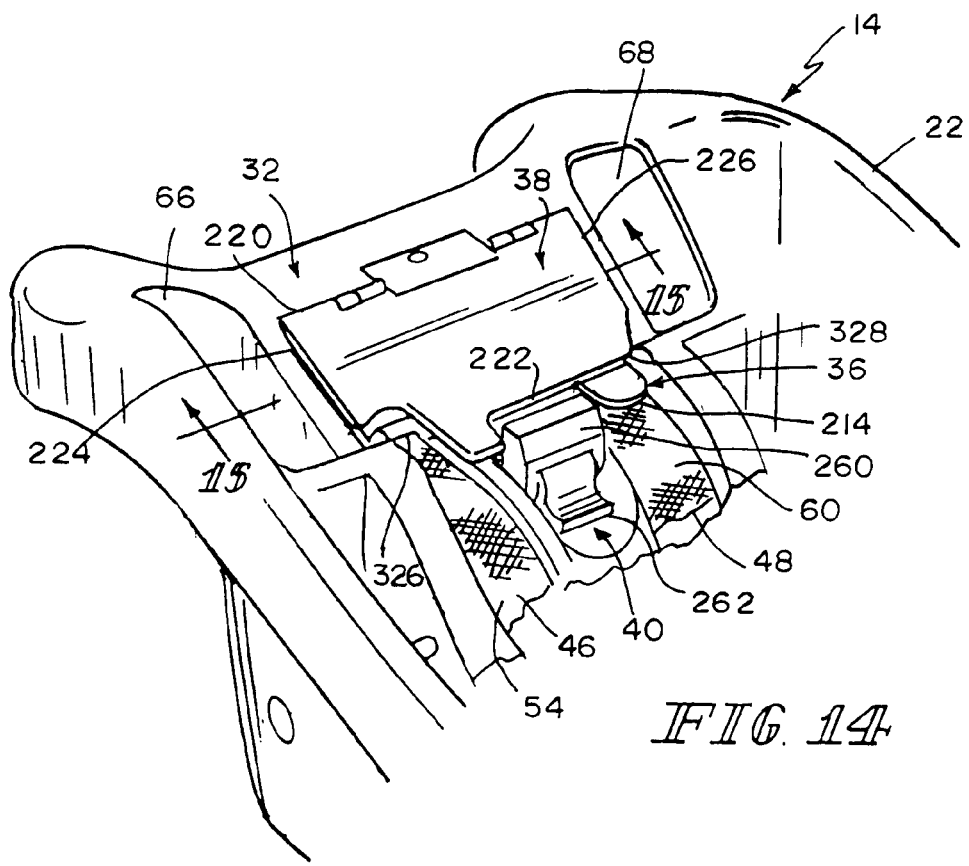
FIG. 14 is a perspective view of the belt anchor system in a locked position and the LATCH belt in a stored position showing the cover and pincher pivoted downward, the lock in a locked position, and showing the LATCH belt passing through first and second lock-out storage exits and entering the LATCH belt storage compartment.
Figure 15:
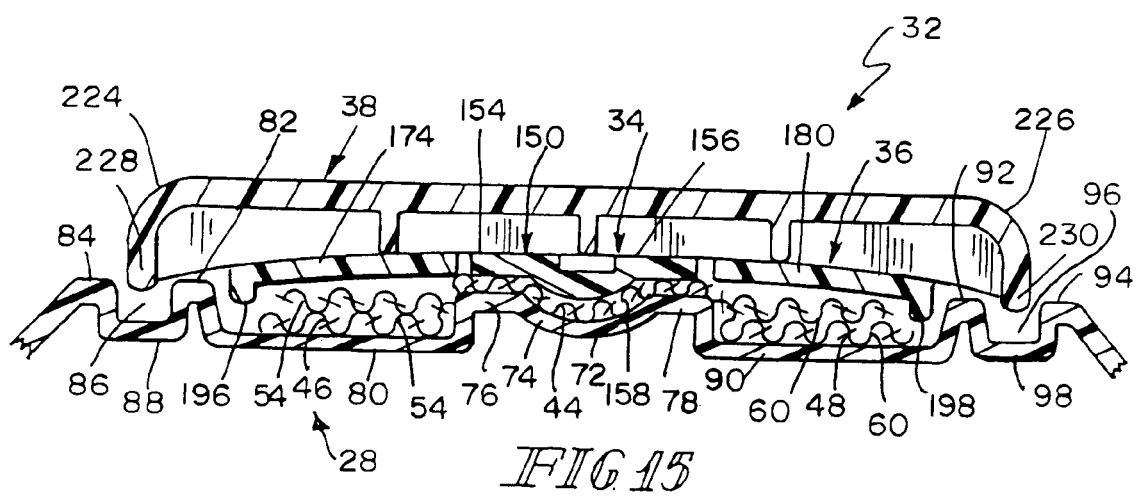
FIG. 15 is a side view taken generally along line 15-15 of FIG. 14 showing the LATCH belt passing over the hump, under the bridge and showing the folded over LATCH belt above the first and second foundation floors.

As shown in FIG. 13, first and second anchor belts 46 and 48 may be rearranged from their use positions to their stored positions when pincher plate 36 and cover plate 38 are in their open positions. First strap 54 of first anchor belt 46 is folded over upon itself at approximately a ninety degree angle at first foundation floor 80 of foundation 28 and first strap 54 is placed in first channel 126. Second strap 60 of second anchor belt 48 is similarly folded over upon itself at an approximately ninety degree angle at second foundation floor 90. Second strap 60 is then placed in second channel 128. First free end 50 and second free end 52 of first and second anchor belts 46 and 48 are then placed in the interior region of storage compartment 122. As shown in FIGS. 14 and 15, pincher plate 36 and cover plate 38 may then be moved to their closed positions and locked in the closed positions by lock 40. First strap 54 of first anchor belt 46 extends outwardly from belt-anchor system 32 into first channel 126 through a first longitudinal anchor belt passageway 326 formed between first outer lower-belt retainer 188 of first paddle 74 and first foundation floor 80 of foundation 28. Second strap 60 extends outwardly from belt-anchor system 32 into second channel 128 through a second longitudinal anchor belt passageway 328 formed between second outer lower-belt retainer 190 of second paddle 180 and second foundation floor 90 of foundation 28.

First and second anchor belts 46 and 48 are shown in FIG. 16 in the stored position, pincher plate 36 in the closed position and cover plate 38 in the open position. A vehicle belt 332 of a vehicle including a vehicle lap belt 334 and a vehicle shoulder belt 336 is threaded through second belt port 68, across the top of pincher plate 36 between first side 170 and second side 172 and is then threaded through first belt port 66 for attachment to a seat-belt buckle of a vehicle. Pincher plate 36 and cover plate 38 are shown in FIG. 17 in a closed and locked position with vehicle belt 332 extending through a transverse vehicle belt passageway 338 that is formed between the top of pincher plate 36 and bottom of cover plate 38 and that extends from first side 224 to second side 226 of cover plate 38. As shown in FIG. 18, first cover projection 228 of cover plate 38 presses vehicle belt 332 into first foundation groove 86 and into engagement with first foundation outside ledge 84 and first foundation inside ledge 82 of foundation 28. Second cover projection 230 of cover plate 38 presses vehicle belt 332 into second foundation groove 96 and into engagement with second foundation inside ledge 92 and second foundation outside ledge 94 of foundation 28. Ribs 232 of cover plate 38 press vehicle belt 332 into engagement with pincher plate 36. Vehicle belt 332 is thereby anchored to seat support 22.

Figure 19:
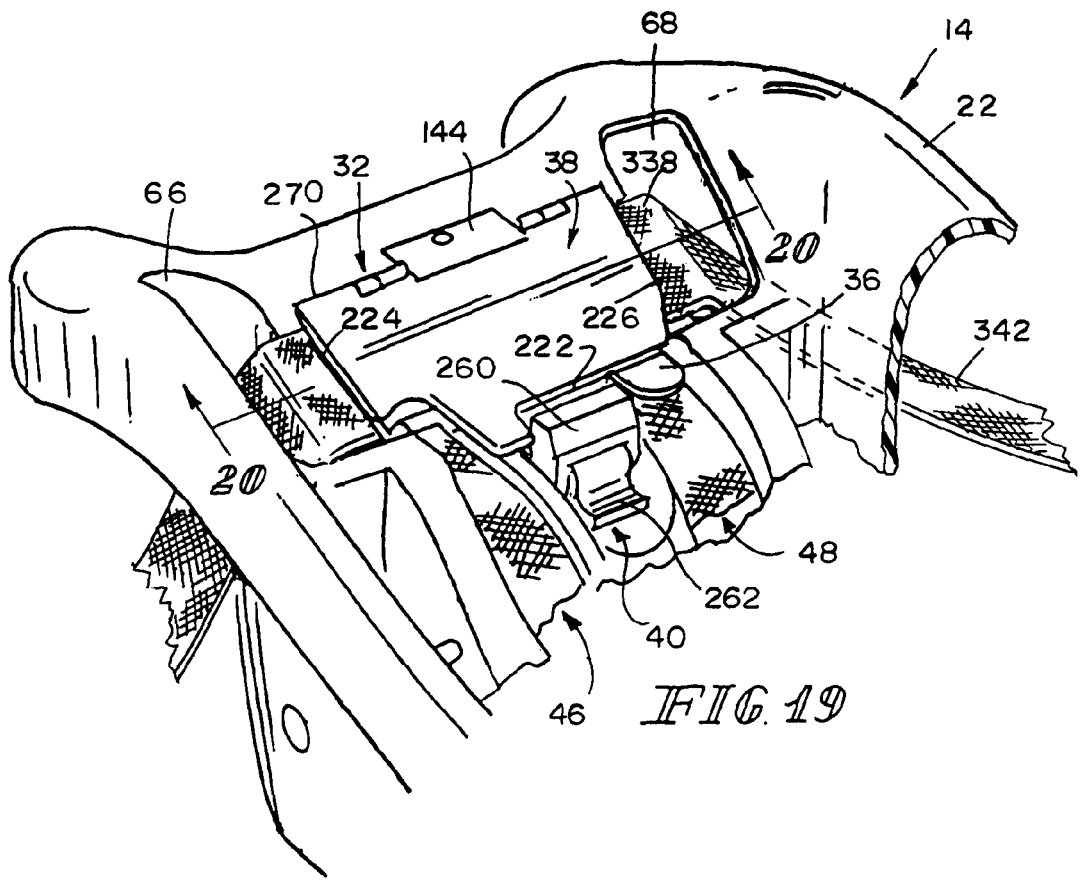
FIG. 19 is a perspective view of the belt anchor system in a vehicle belt locked position showing the pincher and cover pivoted downward, the lock in the locked position, and the LATCH belt in the stored position, and showing a vehicle lap belt passing under the cover and threaded through the belt ports.
Figure 20:
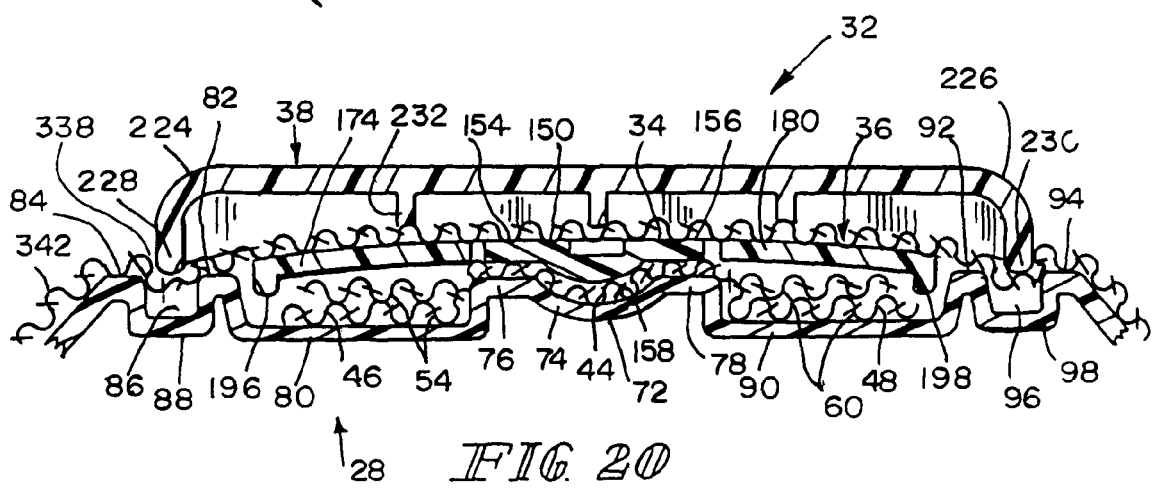
FIG. 20 is a side view taken generally along line 20-20 of FIG. 19 showing the LATCH belt passing over the hump, under the bridge and the folded over LATCH belt above the first and second foundation floors and showing the vehicle lap belt passing over the first foundation outside ledge, into the first foundation groove under the first cover projection, across the first foundation inside ledge, on top of the first paddle, bridge, and second paddle, underneath the cover support ribs, across the second foundation inside ledge, into the second foundation groove under the second cover projection, and over the second foundation outside ledge.

As shown in FIG. 19, a vehicle belt 342 comprising a lap belt extends through transverse vehicle passageway 338 between pincher plate 36 and cover plate 38 and is anchored to seat base 14. As shown in FIG. 20, first cover projection 228 of cover plate 38 presses vehicle belt 342 into first foundation groove 86 and into engagement with first foundation inside ledge 82 and first foundation outside ledge 84 of foundation 28. Second cover projection 230 of cover plate 38 presses vehicle belt 342 into second foundation groove 96 and into engagement with second foundation inside ledge 92 and second foundation outside ledge 94. Vehicle belt 342 is thereby anchored to seat support 22.

In use, seat base 14 is placed on vehicle seat 16 in the back of the vehicle with upper end 26 against the back of vehicle seat 16. A user then lifts upwardly on actuator 262 of lock 40 and removes clasp 260 from cover plate 38. The user may simultaneously press downwardly on cover plate 38 to make it easier to open lock 40. Handle 214 of pincher plate 36 is then lifted upwardly to pivot pincher plate 36 and cover plate 38 to their open positions. First and second free ends 50 and 52 of first and second anchor belts 46 and 48 are then removed from storage compartment 122. First anchor belt 46 is threaded through first belt port 66 and second anchor belt 48 is threaded through second belt port 68. First anchor hook 58 is coupled to first stationary fixture 18 and second anchor hook 62 is coupled to second stationary fixture 20. The user then presses firmly down on seat base 14 and tightens seat-base belt 44 by use of adjustment mechanism 56. The loose end of first strap 54 should be tucked through first belt port 66. Pincher plate 36 and cover plate 38 are then pivoted to their closed positions and locked in their closed positions with lock 40. Seat base 14 is then grasped adjacent first belt port 66 or second belt port 68 and the user tilts and pushes seat base 14 forward and back and from side to side to confirm seat-base belt 44 remains anchored to seat support 22.

When seat base 14 is anchored to vehicle seat 16 with a vehicle belt 332 or 342, first and second anchor belts 46 and 48 are not used and remain in their stored positions. Clasp 240 of lock 40 is released from cover plate 38. Handle 242 of cover plate 38 is grasped and cover plate 38 is pivoted to the open position. Vehicle belt 332 or 342 is threaded through second belt port 68, across the top of pincher plate 36 and through first belt port 66 for attachment to a seat-belt buckle. Vehicle belt 332 or 342 is then tightened while pressing downwardly on seat base 14. Cover plate 38 is pivoted to the closed position and is locked in the closed position by lock 40 while user continues pulling on vehicle belt 332 or 342. User then grasps seat base 14 at first belt port 66 or second belt port 68 and tilts and pushes seat base 14 forward and back and from side to side to confirm that vehicle belt 332 or 342 is securely anchored to seat support 22.

The invention claimed is:

1. A seat base for a child restraint adapted to receive a juvenile seat, the seat base comprising
    a seat support adapted to receive the juvenile seat,
    a seat-base belt including a first anchor belt having a first free end adapted to mate with a first stationary fixture associated with a vehicle seat of a vehicle when the first anchor belt is in a use position, and a second anchor belt having a second free end adapted to mate with a second stationary fixture associated with the vehicle seat when the second anchor belt is in a use position, such that the seat-base belt is adapted to couple the seat support to the vehicle seat when the first and second anchor belts are in the use position,
    belt anchor means for anchoring the seat-base belt to the seat support when the first free end of the first anchor belt is coupled to the first stationary fixture and the second free end of the second anchor belt is coupled to the second stationary fixture when the first and second anchor belts are in the use position, for enabling rearrangement of the first and second anchor belts to a stored position when the first and second free ends of the first and second anchor belts are detached from the first and second stationary fixtures, and for anchoring a vehicle belt of the vehicle to the seat support when the first and second anchor belts are in the stored position,
    wherein the belt anchor means comprises a pincher plate having a first end, a second end, a first side, and a second side, and wherein the first end is pivotably attached to the seat support to cause the pincher plate to pivot between an open position and a closed position about a pivot axis, the second end of the pincher plate is located to lie adjacent the seat support when the pincher plate is in the closed position, the pincher plate is configured to form a transverse anchor belt passageway with the seat support when the pincher plate is in the closed position, the anchor belt passageway is arranged to extend from the first side to the second side of the pincher plate, and the seat-base belt is arranged to extend through the anchor belt passageway when the first and second anchor belts are in the use position, and
    wherein the pincher plate includes a first paddle having a proximal end and a distal end and a second paddle having a proximal end and a distal end, the proximal ends of the first and second paddles are pivotably attached to the seat support, the distal end of the first paddle includes a first belt retainer extending downwardly from a bottom of the first paddle, the distal end of the second paddle includes a second belt retainer extending downwardly from a bottom of the second paddle, the first belt retainer is arranged to block the seat-base belt from moving outwardly beyond the distal end of the first paddle and the second belt retainer is arranged to block the seat-base belt from moving outwardly beyond the distal end of the second paddle when the pincher plate is in the closed position and the first and second anchor belts are in the use position.

2. The seat base of claim 1, wherein the first paddle includes a third belt retainer adjacent the proximal end of the first paddle, the third belt retainer is spaced apart from the first belt retainer such that the seat-base belt extends therebetween when the pincher plate is in the closed position and the first anchor belt is in the use position, the second paddle includes a fourth belt retainer adjacent the proximal end of the second paddle, the fourth belt retainer is spaced apart from the second belt retainer such that the seat-base belt extends therebetween when the pincher plate is in the closed position and the second anchor belt is in the use position.

3. The seat base of claim 1, wherein the belt anchor means further comprises a belt support having a first end attached to the seat support and a second end attached to the seat support, the belt support includes a bridge extending between the first and second ends of the belt support and forming a passageway with the seat base through which the seat-base belt extends when the first and second anchor belts are in the use position and when the first and second anchor belts are in the stored position, and the bridge is located between the first paddle and the second paddle of the pincher plate when the pincher plate is in the closed position.

4. The seat base of claim 1, wherein the second paddle is spaced apart from the first paddle, and the pincher plate further comprises a paddle connector at the second end of the pincher plate extending between the first paddle and the second paddle to cause the first paddle and second paddle to pivot conjointly with one another about the pivot axis.

5. The seat base of claim 1, wherein the pincher plate forms a first longitudinal anchor belt passageway between the first belt retainer of the first paddle and the seat support and a second longitudinal anchor belt passageway between the second belt retainer of the second paddle and the seat support when the pincher plate is in the closed position, the first longitudinal anchor belt passageway is configured to receive the first anchor belt when the first anchor belt is in the stored position, and the second longitudinal anchor belt passageway is configured to receive the second anchor belt when the second anchor belt is in the stored position.

6. The seat base of claim 1, wherein the belt anchor means comprises a cover plate having a first end, a second end, a first side, and a second side, the first end is pivotably attached to the seat support to cause the cover plate to be pivotable about a pivot axis between an open position and a closed position, a bottom of the cover plate forms a vehicle belt passageway adapted to receive a vehicle belt when the cover plate is in the closed position, and the vehicle belt passageway is arranged to extend transversely from the first side to the second side of the cover plate.

7. A seat base for a child restraint adapted to receive a juvenile seat, the seat base comprising
a seat support adapted to receive the juvenile seat,
a seat-base belt including a first anchor belt having a first free end adapted to mate with a first stationary fixture associated with a vehicle seat of a vehicle when the first anchor belt is in a use position, and a second anchor belt having a second free end adapted to mate with a second stationary fixture associated with the vehicle seat when the second anchor belt is in a use position, such that the seat-base belt is adapted to couple the seat support to the vehicle seat when the first and second anchor belts are in the use position,
belt anchor means for anchoring the seat-base belt to the seat support when the first free end of the first anchor belt is coupled to the first stationary fixture and the second free end of the second anchor belt is coupled to the second stationary fixture when the first and second anchor belts are in the use position, for enabling rearrangement of the first and second anchor belts to a stored position when the first and second free ends of the first and second anchor belts are detached from the first and second stationary fixtures, and for anchoring a vehicle belt of the vehicle to the seat support when the first and second anchor belts are in the stored position,
wherein the belt anchor means comprises a pincher plate having a first end, a second end, a first side, and a second side, and wherein the first end is pivotably attached to the seat support to cause the pincher plate to pivot between an open position and a closed position about a pivot axis, the second end of the pincher plate is located to lie adjacent the seat support when the pincher plate is in the closed position, the pincher plate is configured to from a transverse anchor belt passageway with the seat support when the pincher plate is in the closed position, the anchor belt passageway is arranged to extend from the first side to the second side of the pincher plate, and the seat-base belt is arranged to extend through the anchor belt passageway when the first and second anchor belts are in the use position, and
wherein the pincher plate includes a first paddle projection extending along and downwardly from the first side of the pincher plate and a second paddle projection extending along and downwardly from the second side of the pincher plate, the first paddle projection is configured to engage the first anchor belt when the pincher plate is in the closed position and the first anchor belt is in the use position, and the second paddle projection is configured to engage the second anchor belt when the pincher plate is in the closed position and the second anchor belt is in the use position.

8. The seat base of claim 7, wherein the pincher plate further includes an outer vehicle belt retainer extending along and upwardly from the second end of the pincher plate, the outer vehicle belt retainer is configured to block a vehicle belt from moving outwardly beyond the second end of the pincher plate when the pincher plate is in the closed position and a vehicle belt extends transversely across a top of the pincher plate.

9. The seat base of claim 8, wherein the pincher plate includes a first paddle having a proximal end and a distal end and a second paddle having a proximal end and a distal end, the first and second paddles are arranged to lie in spaced apart relation to one another, and outer vehicle belt retainer is arranged to extend between and across the first and second paddles.

10. The seat base of claim 8, wherein the belt anchor means further comprises a cover plate having a first end, a second end, a first side, and a second side, the first end of the cover plate is selectively pivotable about the pivot axis of the pincher plate between an open position and a closed position, the cover plate is arranged to overlie the pincher plate when the pincher plate is in the closed position and the cover plate is in the closed position, a vehicle belt passageway is formed between the pincher plate and the cover plate when the pincher plate and cover plate are in the closed position, and the vehicle belt passageway is arranged to extend transversely between the first and second ends of the cover plate and adapted to receive a vehicle belt.

11. The seat base of claim 7, wherein the pincher plate further includes a handle attached to the second end of the pincher plate and adapted to facilitate manual movement of the pincher plate between the open and closed positions.

12. A seat base for a child restraint adapted to receive a juvenile seat, the seat base comprising
a seat support adapted to receive the juvenile seat,
a seat-base belt including a first anchor belt having a first free end adapted to mate with a first stationary fixture associated with a vehicle seat of a vehicle when the first anchor belt is in a use position, and a second anchor belt having a second free end adapted to mate with a second stationary fixture associated with the vehicle seat when the second anchor belt is in a use position, such that the seat-base belt is adapted to couple the seat support to the vehicle seat when the first and second anchor belts are in the use position,
belt anchor means for anchoring the seat-base belt to the seat support when the first free end of the first anchor belt is coupled to the first stationary fixture and the second free end of the second anchor belt is coupled to the second stationary fixture when the first and second anchor belts are in the use position, for enabling rearrangement of the first and second anchor belts to a stored position when the first and second free ends of the first and second anchor belts are detached from the first and second stationary fixtures, and for anchoring a vehicle belt of the vehicle to the seat support when the first and second anchor belts are in the stored position, wherein the belt anchor means comprises a pincher plate having a first end, a second end, a first side, and a second side, and wherein the first end is pivotably attached to the seat support to cause the pincher plate to pivot between an open position and a closed position about a pivot axis, the second end of the pincher plate is located to lie adjacent the seat support when the pincher plate is in the closed position, the pincher plate is configured to form a transverse anchor belt passageway with the seat support when the pincher plate is in the closed position, the anchor belt passageway is arranged to extend from the first side to the second side of the pincher plate, and the seat-base belt is arranged to extend through the anchor belt passageway when the first and second anchor belts are in the use position, wherein the pincher plate includes an outer vehicle belt retainer extending along and upwardly from the second end of the pincher plate, the outer vehicle belt retainer is configured to block a vehicle belt from moving outwardly beyond the second end of the pincher plate when the pincher plate is in the closed position and a vehicle belt extends transversely across a top of the pincher plate, wherein the pincher plate includes a first paddle having a proximal end and a distal end and a second paddle having a proximal end and a distal end, the first and second paddles are arranged to lie in spaced apart relation to one another, and outer vehicle belt retainer is arranged to extend between and across the first and second paddles, and wherein the first paddle includes an inner vehicle belt retainer spaced apart from the outer vehicle belt retainer of the first paddle, and the second paddle includes an inner vehicle belt retainer spaced apart from the outer vehicle belt retainer of the second paddle, the belt anchor means further comprises a belt support coupled to the seat support, the belt support is located between the first paddle and the second paddle when the pincher plate is in the closed position, the belt support includes a bridge having a first end coupled to the seat support and a second end coupled to the seat support, the transverse anchor belt passageway extending between the seat support and the bridge.

13. A seat base for a child restraint adapted to receive a juvenile seat, the seat base comprising a seat support adapted to receive the juvenile seat, a seat-base belt including a first anchor belt having a first free end adapted to mate with a first stationary fixture associated with a vehicle seat of a vehicle when the first anchor belt is in a use position, and a second anchor belt having a second free end adapted to mate with a second stationary fixture associated with the vehicle seat when the second anchor belt is in a use position, such that the seat-base belt is adapted to couple the seat support to the vehicle seat when the first and second anchor belts are in the use position, belt anchor means for anchoring the seat-base belt to the seat support when the first free end of the first anchor belt is coupled to the first stationary fixture and the second free end of the second anchor belt is coupled to the second stationary fixture when the first and second anchor belts are in the use position, for enabling rearrangement of the first and second anchor belts to a stored position when the first and second free ends of the first and second anchor belts are detached from the first and second stationary fixtures, and for anchoring a vehicle belt of the vehicle to the seat support when the first and second anchor belts are in the stored position, wherein the belt anchor means comprises a cover plate having a first end, a second end, a first side, and a second side, the first end is pivotably attached to the seat support to cause the cover plate to be pivotable about a pivot axis between an open position and a closed position, a bottom of the cover plate forms a vehicle belt passageway adapted to receive a vehicle belt when the cover plate is in the closed position, and the vehicle belt passageway is arranged to extend transversely from the first side to the second side of the cover plate, and wherein the cover plate includes a first cover projection extending along and downwardly from the first side of the cover plate and a second cover projection extending along and downwardly from the second side of the cover plate, and the first and second cover projections are configured to engage the vehicle belt when the cover plate is in the closed position and the vehicle belt is located in the vehicle belt passageway.

14. The seat base of claim 13, wherein the cover plate includes a plurality of ribs extending downwardly from a bottom of the cover plate, the ribs are located between the first and second cover projections, and the ribs are configured to engage the vehicle belt when the cover plate is in the closed position and the vehicle belt is located in the vehicle belt passageway.

15. The seat base of claim 13, wherein the cover plate further includes a clasp receiver at the second end of the cover plate, the belt anchor means further comprises a lock attached to the seat support, and wherein the lock is configured to engage selectively the clasp receiver of the cover plate when the cover plate is in the closed position and to lock selectively the cover plate in the closed position.

16. The seat base of claim 15, wherein the lock comprises a clasp configured to engage selectively the clasp receiver of the cover plate when the cover plate is in the closed position, the clasp is mounted for pivotable movement between an extended position wherein the clasp is configured to engage the clasp receiver and a retracted position, an actuator is pivotably attached to the seat support, the actuator is configured to pivot the clasp toward the extended position and to retain the clasp temporarily in the extended position when the clasp is in engagement with the clasp receiver.

17. The seat base of claim 13, wherein the belt anchor means further comprises a pincher plate having a first end, a second end, a first side, and a second side, the first end of the pincher plate is pivotably attached to the seat support to cause the pincher plate to be pivotable between an open position and a closed position, the pincher plate forms a transverse anchor belt passageway with the seat support when the pincher plate is in the closed position, the cover plate is arranged to overlie the pincher plate when the pincher plate and cover plate are in the closed position, the first cover projection of the cover plate is spaced outwardly from the first side of the pincher plate, and the second cover projection of the cover plate is spaced outwardly from the second side of the pincher plate when the pincher plate and cover plate are in the closed position.

18. The seat base of claim 13, wherein the cover plate further includes a handle attached to the second end of the cover plate and adapted to facilitate manual movement of the cover plate between the open and closed positions.

19. The seat base of claim 13, wherein the belt anchor means comprises a belt support including an upper bridge mount attached to the seat support, a lower bridge mount attached to the seat support, and a bridge arranged to extend between the upper bridge mount and the lower bridge mount, and the bridge is formed to include a belt passageway through which the seat-base belt extends.

20. A seat base for a child restraint adapted to receive a juvenile seat, the seat base comprising
a seat support adapted to receive the juvenile seat,
a seat-base belt including a first anchor belt having a first free end adapted to mate with a first stationary fixture associated with a vehicle seat of a vehicle when the first anchor belt is in a use position, and a second anchor belt having a second free end adapted to mate with a second stationary fixture associated with the vehicle seat when the second anchor belt is in a use position such that the seat-base belt is adapted to coupled to the seat support to the vehicle seat when the first and second anchor belts are in the use position,
belt anchor means for anchoring the seat-base belt to the seat support when the first free end of the first anchor belt is coupled to the first stationary fixture and the second free end of the second anchor belt is coupled to the second stationary fixture when the first and second anchor belts are in the use position, for enabling rearrangement of the first and second anchor belts to a stored position when the first and second free ends of the first and second anchor belts arc detached from the first and second stationary fixtures, and for anchoring a vehicle belt of the vehicle to the seat support when the first and second anchor belts are in the stored position,
wherein the belt anchor means comprises a belt support including an upper bridge mount attached to the seat support, a lower bridge mount attached to the seat support, and a bridge arranged to extend between the upper bridge mount and the lower bridge mount, and the bridge is formed to include a belt passageway through which the seat-base belt extends, and
wherein the belt anchor means further comprises a pincher plate pivotably coupled to the upper bridge mount for pivotal movement about a pivot axis and a cover plate pivotably coupled to the upper bridge mount for pivotable movement about the pivot axis.

21. The seat base of claim 20, wherein the seat support includes an upper receiver configured to receive the upper bridge mount of the belt support and a lower receiver configured to receive the lower bridge mount of the belt support.

22. The seat base of claim 20, wherein the belt anchor means further comprises a lock having a clasp and an actuator and the actuator pivotably coupled to the lower bridge mount and the clasp.

23. The seat base of claim 20, wherein the bridge includes an elongate longitudinal depression forming a downwardly extending bridge bump.

24. The seat base of claim 20, wherein the seat support includes a foundation associated with the belt anchor means, the foundation includes a center hump having a longitudinal hump depression, a first foundation floor located on a first side of the center hump, and a second foundation floor located on an opposite second side of the center hump.

25. The seat base of claim 24, wherein the foundation further comprises an elongate first inside ledge located outwardly from the first foundation floor, an elongate second inside ledge located outwardly from the second foundation floor, an elongate first outside ledge located outwardly from the first inside ledge, an elongate second outside ledge located outwardly from the second inside ledge, a first foundation groove located between the first inside ledge and first outside ledge, and a second foundation groove located between the second inside ledge and the second outside ledge.

26. A seat base for a child restraint adapted to receive a juvenile seat, the seat base comprising
a seat support adapted to receive the juvenile seat,
a seat-base belt including a first anchor belt having a first free end adapted to mate with a first stationary fixture associated with a vehicle seat of a vehicle when the first anchor belt is in a use position, and a second anchor belt having a second free end adapted to mate with a second stationary fixture associated with the vehicle seat when the second anchor belt is in a use position, such that the seat-base belt is adapted to couple the seat support to the vehicle seat when the first and second anchor belts are in the use position,
belt anchor means for anchoring the seat-base belt to the seat support when the first free end of the first anchor belt is coupled to the first stationary fixture and the second free end of the second anchor belt is coupled to the second stationary fixture when the first and second anchor belts are in the use position, for enabling rearrangement of the first and second anchor belts to a stored position when the first and second free ends of the first and second anchor belts are detached from the first and second stationary fixtures, and for anchoring a vehicle belt of the vehicle to the seat support when the first and second anchor belts are in the stored position,
wherein the seat support includes a foundation associated with the belt anchor means, the foundation includes a center hump having a longitudinal hump depression, a first foundation floor located on a first side of the center hump, and a second foundation floor located on an opposite second side of the center hump,
wherein the foundation further comprises an elongate first inside ledge located outwardly from the first foundation floor, an elongate second inside ledge located outwardly from the second foundation floor, an elongate first outside ledge located outwardly from the first inside ledge, an elongate second outside ledge located outwardly from the second inside ledge, a first foundation groove located between the first inside ledge and first outside ledge, and a second foundation groove located between the second inside ledge and the second outside ledge, and
wherein the belt anchor means comprises a pincher plate pivotably attached to the seat support for pivotable movement between an open position and a closed position, the pincher plate includes a first side having a first projection and a second side having a second projection, the first projection is configured to press the seat-base belt against the first inside ledge of the foundation, and the second projection is configured to press the seat-base belt against the second inside ledge of the foundation when the pincher plate is in the closed position and the first and second anchor belts are in the use position.

27. The seat base of claim 26, wherein the belt anchor means comprises a cover plate pivotably attached to the seat support for pivotable movement between an open position and a closed position, the cover plate includes a first side having a first cover projection and a second side having a second cover projection, the first cover projection is configured to press the seat-base belt into the first foundation groove and into engagement with the first inside ledge and first outside ledge, and the second cover projection is configured to press the seat-base belt into the second foundation groove and into engagement with the second inside ledge and second outside ledge when the cover plate is in the closed position and the first and second anchor belts are in the use position.

28. A seat base for a child restraint adapted to receive a juvenile seat, the seat base comprising
a seat support adapted to receive the juvenile seat, the seat support including foundation,
a seat-base belt including a first anchor belt and a second anchor belt adapted to anchor the seat support to a vehicle seat of a vehicle when the first and second anchor belts are in a use position, the seat-base belt extending across the foundation of the seat base when the first and second anchor belts are in the use position, and
a pincher plate having a first end, a second end, a first side, and a second side, and wherein the first side of the pincher plate is pivotably attached to the seat support to cause the pincher plate to pivot between an open position and a closed position, a transverse anchor belt passageway is located between the pincher plate and the foundation of the seat support when the pincher plate is in the closed position and extends transversely from the first side to the second side of the pincher plate, the transverse anchor belt passageway configured to receive the seat-base belt when the first and second anchor belts are in the use position, a first longitudinal anchor belt passageway located between the second end of the pincher plate and the foundation of the seat support when the pincher plate is in the closed position, a second longitudinal anchor belt passageway located between the second end of the pincher plate and the foundation of the seat support when the pincher plate is in the closed position, the first anchor belt extending through the first longitudinal anchor belt passageway when the first anchor belt is in a stored position, the second anchor belt extending through the second anchor belt passageway when the second anchor belt is in a stored position, the first anchor belt being movable from the use position to the stored position when the pincher plate is in the open position, the second anchor belt being movable from the use position to the stored position when the pincher plate is in the open position.

29. The seat base of claim 28, further comprising a cover plate pivotably attached to the seat support, the cover plate being pivotable between an open position and a closed position, the cover plate overlying the pincher plate when the cover plate is in the closed position, and a transverse vehicle belt passageway located between the pincher plate and the cover plate when the cover plate is in the closed position adapted to receive a vehicle belt of the vehicle.

30. A seat base for a child restraint adapted to receive a juvenile seat, the seat base comprising
a seat support adapted to receive the juvenile seat, the seat support including a foundation having a first foundation inside ledge and a second foundation inside ledge,
a seat-base belt including a first anchor belt and a second anchor belt adapted to anchor the seat support to a vehicle seat of a vehicle when the first and second anchor belts are in a use position,
a pincher plate having a first end, a second end, a first side, and a second side, wherein the first end of the pincher plate is pivotably coupled to the seat support wherein the pincher plate is pivotable with respect to the seat support, the pincher plate includes a first paddle and a spaced apart second paddle, the first paddle includes a first paddle projection extending along the first side of the pincher plate and the second paddle includes a second projection extending along the second side of the pincher plate, a transverse anchor belt passageway located between the pincher plate and the foundation extending between the first side and second side of the pincher plate, the first paddle projection pressing the first anchor belt into engagement with the first inside foundation ledge of the foundation when the first anchor belt is in the use position and pincher plate is in the closed position and the second paddle projection pressing the second anchor belt into engagement with the second foundation inside ledge when the second anchor belt is in the use position and the pincher plate is in the closed position, and
a cover plate having a first end, a second end, a first side, and a second side, and wherein the first end of the cover plate is pivotably coupled to the seat support such that the pincher plate is pivotable with respect to the seat support between open and closed positions, the cover plate overlying the pincher plate when the pincher plate is in the closed position and the cover plate is in the closed position, a first cover projection extending along the first side of the cover plate and a second cover projection extending along the second side of the cover plate, the first cover projection located outwardly from the first paddle projection and the second cover projection located outwardly from the second paddle projection when the pincher plate is in the closed position and the cover plate is in the closed position, the first cover projection pressing the first anchor belt into engagement with the first foundation inside ledge when the first anchor belt is in the use position and the cover plate is in the closed position, and the second cover projection pressing the second anchor belt into engagement with the second foundation inside ledge when the second anchor belt is in the use position and the cover plate is in the closed position.

* * * * *